(12) United States Patent
Iwatsuka et al.

(10) Patent No.: US 11,366,344 B2
(45) Date of Patent: Jun. 21, 2022

(54) OPTICAL MODULATOR

(71) Applicant: TDK Corporation, Tokyo (JP)

(72) Inventors: Shinji Iwatsuka, Tokyo (JP); Makoto Endo, Tokyo (JP); Kenji Sasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/651,633

(22) PCT Filed: Sep. 28, 2018

(86) PCT No.: PCT/JP2018/036329
§ 371 (c)(1),
(2) Date: Mar. 27, 2020

(87) PCT Pub. No.: WO2019/069815
PCT Pub. Date: Apr. 11, 2019

(65) Prior Publication Data
US 2020/0310170 A1    Oct. 1, 2020

(30) Foreign Application Priority Data

Oct. 2, 2017    (JP) .............................. JP2017-192812

(51) Int. Cl.
*G02F 1/035*    (2006.01)
*G02F 1/01*    (2006.01)
(Continued)

(52) U.S. Cl.
CPC .............. *G02F 1/011* (2013.01); *G02F 1/035* (2013.01); *G02F 1/2255* (2013.01);
(Continued)

(58) Field of Classification Search
CPC ........ G02F 1/011; G02F 1/2255; G02F 1/035; G02F 1/212; G02F 2201/127;
(Continued)

(56) References Cited

U.S. PATENT DOCUMENTS

| 5,404,412 A | 4/1995 | Seino et al. |
| 6,846,428 B2 * | 1/2005 | McCaughan ......... G02F 1/2255 216/101 |

(Continued)

FOREIGN PATENT DOCUMENTS

| JP | 05-066428 A | 3/1993 |
| JP | 05-113513 A | 5/1993 |

(Continued)

OTHER PUBLICATIONS

English translation of JP2014-142411.*
(Continued)

*Primary Examiner* — Robert Tavlykaev
(74) *Attorney, Agent, or Firm* — McDermott Will & Emery LLP

(57) ABSTRACT

An optical modulator includes: a substrate; a waveguide layer including first and second optical waveguides formed of an electro-optic material film on the substrate to have a ridge shape and to be disposed adjacent to each other; an RF part that applies a modulated signal to the optical waveguides; and a DC part that applies a DC bias to the optical waveguides. The DC part includes: a buffer layer covering at least upper surfaces of the optical waveguides; a first bias electrode opposed to the first optical waveguide through the buffer layer; and a second bias electrode provided adjacent to the first bias electrode. A first DC bias voltage is applied between the first and second bias electrodes. A waveguide layer removal area in which at least part of the waveguide layer is removed is provided at least under an area between the first and second bias electrodes.

19 Claims, 14 Drawing Sheets

(51) Int. Cl.
*G02F 1/225* (2006.01)
*G02B 6/12* (2006.01)
*G02F 1/21* (2006.01)

(52) U.S. Cl.
CPC .... *G02B 2006/12142* (2013.01); *G02F 1/212* (2021.01); *G02F 2201/063* (2013.01); *G02F 2201/127* (2013.01); *G02F 2202/20* (2013.01); *G02F 2203/20* (2013.01); *G02F 2203/21* (2013.01)

(58) Field of Classification Search
CPC ........... G02F 2201/063; G02F 2202/20; G02F 2203/20; G02F 2203/21; G02B 2006/12142
USPC ......................................................... 385/1–3
See application file for complete search history.

(56) References Cited

U.S. PATENT DOCUMENTS

| | | | |
|---|---|---|---|
| 9,746,743 B1* | 8/2017 | Rabiei | ................... G02F 1/2255 |
| 2005/0175271 A1 | 8/2005 | Sugiyama et al. | |
| 2006/0159384 A1 | 7/2006 | Sugiyama | |
| 2007/0127862 A1* | 6/2007 | Mitomi | ................... G02F 1/035 |
| | | | 385/8 |
| 2008/0031564 A1 | 2/2008 | Sugiyama | |
| 2015/0138619 A1 | 5/2015 | Iwatsuka et al. | |
| 2018/0164612 A1* | 6/2018 | Kondou | .................. G02B 6/122 |
| 2019/0146302 A1 | 5/2019 | Iwatsuka et al. | |
| 2019/0271897 A1 | 9/2019 | Iwatsuka et al. | |

FOREIGN PATENT DOCUMENTS

| | | |
|---|---|---|
| JP | 06-043503 A | 2/1994 |
| JP | 3001027 B2 | 1/2000 |
| JP | 2006-195383 A | 7/2006 |
| JP | 4485218 B2 | 6/2010 |
| JP | 2012-145894 A | 8/2012 |
| JP | 2014-006348 A | 1/2014 |
| JP | 2014-142411 A | 8/2014 |
| JP | 2015-118371 A | 6/2015 |
| JP | 2017-129834 A | 7/2017 |
| WO | 2017/183484 A1 | 2/2019 |

OTHER PUBLICATIONS

International Search Report issued in corresponding International Patent Application No. PCT/JP2018/036329, dated Dec. 11, 2018, with English translation.

* cited by examiner

OPTICAL MODULATOR

CROSS REFERENCE TO RELATED APPLICATIONS

This application is the U.S. National Phase under 35 U.S.C. § 371 of International Application No. PCT/JP2018/036329, filed on Sep. 28, 2018, which claims the benefit of Japanese Patent Application No. 2017-192812, filed on Oct. 2, 2017, the entire contents of each are hereby incorporated by reference.

TECHNICAL FIELD

The present invention relates to an optical modulator used in the fields of optical communication and optical measurement and, more particularly, to an electrode structure of a Mach-Zehnder optical modulator.

BACKGROUND ART

Communication traffic has been remarkably increased with widespread Internet use, and optical fiber communication is becoming significantly important. The optical fiber communication is a technology that converts an electric signal into an optical signal and transmits the optical signal through an optical fiber and has wide bandwidth, low loss, and resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

As the optical modulator, a Mach-Zehnder optical modulator in which an optical waveguide is formed by Ti (titanium) diffusion in the vicinity of the surface of a lithium niobate single-crystal substrate has been put to practical use (see, e.g., Patent Document 1). The Mach-Zehnder optical modulator uses an optical waveguide (Mach-Zehnder optical waveguide) having a Mach-Zehnder interferometer structure that separates light emitted from one light source into two beams, makes the two beams pass through different paths, and then recombines the two beams to cause interference. Although high-speed optical modulators having a modulation speed of 40 Gb/s or higher are commercially available, they have a major drawback that the entire length thereof is as long as about 10 cm.

On the other hand, Patent Documents 2 and 3 disclose a Mach-Zehnder optical modulator using a c-axis oriented lithium niobate film. The optical modulator using the lithium niobate film achieves significant reduction in size and driving voltage as compared with an optical modulator using the lithium niobate single-crystal substrate.

When a voltage is applied to an electrode of an optical modulator, a voltage applied to an optical waveguide differs between immediately after and after the elapse of a sufficiently long time from the voltage application, whereby there occurs a phenomenon in which output light from the optical modulator changes. The change in the voltage applied to the optical waveguide is called DC drift, and the DC drift is required to be suppressed as much as possible.

Patent Document 4 states that, in order to suppress the DC drift in a waveguide type optical device having a crystal substrate of, e.g., lithium niobate, the crystal substrate is doped with group V elements such as phosphorous (P) or chlorine (Cl) to immobilize mobile ions inside and on the surface of the crystal substrate. Further, Patent Document 5 states that, in order to reduce the DC drift in a directional coupler type optical control device having, on a lithium niobate crystal substrate, two optical waveguides disposed in proximity to each other and a control electrode grounded in the vicinity thereof, a low-resistance area lower in resistivity than the bulk crystal of lithium niobate is provided in the lithium niobate crystal substrate. The low-resistance area can be formed by proton-ion exchange in which the lithium niobate substrate is immersed in an acid such as heated benzoic acid or pyrophosphoric acid to exchange lithium ion ($Li^+$) in the lithium niobate for proton ($H^+$).

CITATION LIST

Patent Document

[Patent Document 1] Japanese Patent No. 4,485,218
[Patent Document 2] JP 2006-195383 A
[Patent Document 3] JP 2014-006348 A
[Patent Document 4] JP H05-113513 A
[Patent Document 5] JP H05-066428 A

SUMMARY OF THE INVENTION

Problem to be Solved by Invention

As described above, the DC drift is a serious problem in an optical modulator, and a device structure capable of suppressing the DC drift without using special lithium niobate crystal doped with P or Cl is desired.

It is therefore an object of the present invention to provide an optical modulator having a device structure stably controllable over a long time period by reducing the DC drift.

Means for Solving the Problem

To achieve the above object, an optical modulator according to a first aspect of the present invention includes: a substrate; a waveguide layer including first and second optical waveguides formed of an electro-optic material film formed on the substrate so as to have a ridge shape and to be disposed adjacent to each other; an RF part that applies a modulated signal to the first and second optical waveguides; and a DC part that applies a DC bias to the first and second optical waveguides, wherein the DC part includes: a buffer layer covering at least upper surfaces of the first and second optical waveguides; a first bias electrode opposed to the first optical waveguide through the buffer layer; and a second bias electrode provided adjacent to the first bias electrode, a first DC bias voltage is applied between the first and second bias electrodes, and a waveguide layer removal area in which at least part of the waveguide layer is removed is provided at least under a first electrode isolation area between the first and second bias electrodes.

According to the present invention, it is possible to prevent the movement of mobile ions caused due to continuous application of the DC bias between the first and second bias electrodes, whereby DC drift can be reduced. Thus, there can be provided an optical modulator stably controllable over a long period of time.

In the present invention, the DC part preferably further includes a third bias electrode opposed to the second optical waveguide through the buffer layer and a fourth bias electrode provided adjacent to the third bias electrode, a second DC bias voltage is preferably applied between the third and fourth bias electrodes, and the waveguide layer removal area is preferably provided under a second electrode isolation area between the third and fourth bias electrodes. In this case, the second bias electrode is preferably positioned on the side opposite to the third bias electrode as viewed from the first bias electrode, and the fourth bias electrode is preferably positioned on the side opposite to the first bias electrode as viewed from the third bias electrode. With this configuration, it is possible to reduce the DC drift of an optical modulator having a so-called dual drive type electrode structure.

In the present invention, the DC part preferably further includes a fifth bias electrode provided between the first and third bias electrodes, and the waveguide layer removal area is preferably provided under a third electrode isolation area between the first and fifth bias electrodes and under a fourth electrode isolation area between the third and fifth bias electrodes. With this configuration, it is possible to reduce the DC drift of an optical modulator having a so-called dual drive type electrode structure.

In the present invention, the second bias electrode is also preferably opposed to the second optical waveguide through the buffer layer. With this configuration, the DC bias can be applied not only to the first optical waveguide, but also to the second optical waveguide.

In the present invention, the waveguide layer removal area is preferably an area in which the waveguide layer is removed together with the buffer layer to expose the substrate. In this case, the waveguide layer removal area may be an area in which a part of the substrate is further removed. Further, the waveguide layer removal area may be an area in which a part of the waveguide layer is removed together with the buffer layer and in which the substrate is covered with the remain part of the waveguide layer. In all of the above configurations, the waveguide layer removal area is provided in the electrode isolation area of the DC part, so that the DC drift can be reduced.

In the present invention, the DC part preferably further includes a protective layer formed between the waveguide layer and the buffer layer so as to cover both side surfaces of each of the first and second optical waveguides, and the waveguide layer removal area is preferably an area in which the waveguide layer is removed together with the buffer layer and the protective layer. With this configuration, it is possible to protect the side surfaces of the optical waveguide and to reduce the DC drift.

In the present invention, the RF part preferably includes first and second signal electrodes opposed respectively to the first and second optical waveguides through the buffer layer, a first ground electrode provided adjacent to the first signal electrode, and a second ground electrode provided adjacent to the second signal electrode, and the waveguide layer under a fifth electrode isolation area between the first signal electrode and the first ground electrode and under a sixth electrode isolation area between the second signal electrode and the second ground electrode is preferably not removed but is left. With this configuration, it is possible to reduce the DC drift while ensuring a desired electric field efficiency in the RF part.

In the present invention, each of the first and second optical waveguides preferably has at least one linear section and at least one curved section, the RF part is preferably provided at a position overlapping a part of the liner part in a plan view, and the DC part is preferably provided at a position overlapping another part of the linear section in a plan view. With this configuration, the optical waveguide can be configured in a folded shape to reduce the element length. In particular, when an optical waveguide formed of a lithium niobate film is used, it has small loss even when the curvature radius thereof is reduced up to about 50 μm, and the effects of the present invention are significant. This allows reduction in size of an optical modulator of an independent bias type in which the RF part and the DC part are independently constructed.

In the present invention, the substrate is preferably a single crystal substrate, the electro-optic material film is preferably a lithium niobate film, and the lithium niobate film is preferably an epitaxial film having a film thickness of 2 μm or smaller, and the c-axis of the lithium niobate film is preferably oriented perpendicular to a main surface of the substrate. When a Mach-Zehnder optical waveguide of an optical modulator is formed using the lithium niobate film, the optical waveguide can be made very thin and narrow in line width, whereby a small-sized and high-quality optical modulator can be obtained. However, since the optical waveguide is very thin and narrow in line width, a problem of electric field concentration is conspicuous. However, according to the present invention, such a problem can be solved, and thus there can be provided an optical modulator having satisfactory high-frequency characteristics and reduced wavelength chirp of modulated light and capable of being driven with a low voltage.

Further, an optical modulator according to a second aspect of the present invention includes: a substrate; a waveguide layer including first and second optical waveguides of an electro-optic material film formed on the substrate so as to have a ridge shape and to be disposed adjacent to each other; an RF part that applies a modulated signal to the first and second optical waveguides; and a DC part that applies a DC bias to the first and second optical waveguides, wherein the DC part includes: a buffer layer covering at least upper surfaces of the first and second optical waveguides; a first bias electrode opposed to the first optical waveguide through the buffer layer; and a second bias electrode provided adjacent to the first bias electrode, a first DC bias voltage is applied between the first and second bias electrodes, and a minimum thickness of the waveguide layer in a first electrode isolation area between the first and second bias electrodes is smaller than a minimum thickness of the waveguide layer between the first electrode isolation area and the first optical waveguide.

According to the present invention, it is possible to prevent the movement of mobile ions caused due to continuous application of the DC bias between the first and second bias electrodes, whereby DC drift can be reduced. Thus, there can be provided an optical modulator stably controllable over a long period of time.

In the present invention, the DC part preferably further includes a third bias electrode opposed to the second optical waveguide through the buffer layer and a fourth bias electrode provided adjacent to the third bias electrode, a second DC bias voltage is preferably applied between the third and fourth bias electrodes, and a minimum thickness of the waveguide layer in a second electrode isolation area between the third and fourth bias electrodes is preferably smaller than a minimum thickness of the waveguide layer between the second electrode isolation area and the second optical waveguide. In this case, the second bias electrode is preferably positioned on the opposite side to the third bias electrode as viewed from the first bias electrode, and the fourth bias electrode is preferably positioned on the side opposite to the first bias electrode as viewed from the third bias electrode. With this configuration, it is possible to reduce the DC drift of an optical modulator having a so-called dual drive type electrode structure.

In the present invention, the DC part preferably further includes a fifth bias electrode provided between the first and third bias electrodes, a minimum thickness of the waveguide layer in a third electrode isolation area between the first and fifth bias electrodes is preferably smaller than a minimum thickness of the waveguide layer between the third electrode isolation area and the first optical waveguide, and a minimum thickness of the waveguide layer in a fourth electrode isolation area between the third and fifth bias electrodes is preferably smaller than a minimum thickness of the waveguide layer between the fourth electrode isolation area and the second optical waveguide. With this configuration, it is possible to reduce the DC drift of an optical modulator having a so-called dual drive type electrode structure.

In the present invention, the second bias electrode is preferably opposed to the second optical waveguide through the buffer layer, and a minimum thickness of the waveguide layer in the first electrode isolation area is preferably smaller than a minimum thickness of the waveguide layer between the first electrode isolation area and the second optical waveguide. With this configuration, the DC bias can be applied not only to the first optical waveguide, but also to the second optical waveguide.

In the present invention, the DC part preferably further includes a protective layer formed between the waveguide layer and the buffer layer so as to cover both side surfaces of each of the first and second optical waveguides, and the waveguide layer in the electrode isolation area is preferably not covered with the buffer layer and the protective layer but is exposed. Thus, when the buffer layer and the protective layer are removed in the electrode isolation area of the DC part, the DC drift can be further reduced.

The waveguide layer preferably has a cross-sectional shape gradually reduced in thickness as the distance from the first optical waveguide or second optical waveguide increases. With this configuration, it is possible to easily realize a shape in which the minimum thickness of the waveguide layer in the electrode isolation area is smaller than the minimum thickness of the waveguide layer between the electrode isolation area and the optical waveguide, allowing such a shape to be formed during processing of the waveguide layer into a ridge shape.

Advantageous Effects of the Invention

According to the present invention, there can be provided an optical modulator having a device structure stably controllable over a long period of time by reducing the DC drift.

BRIEF DESCRIPTION OF DRAWINGS

FIGS. 1A and 1B are plan views of an optical modulator 100 according to a first embodiment of the present invention, in which FIG. 1A illustrates only an optical waveguide, and FIG. 1B illustrates the entire configuration of the optical modulator 100 including traveling-wave electrodes.

FIGS. 2A and 2B are schematic cross-sectional views of the optical modulator 100 illustrated in FIGS. 1A and 1B, in which FIG. 2A is a cross-sectional view of the RF part $S_{RF}$ taken along line A-A' in FIG. 1B, and FIG. 2B is a cross-sectional view of the DC part $S_{DC}$ taken along line B-B' in FIG. 1B.

FIGS. 3A to 3C are views for explaining the action of the waveguide layer removal area D, in which FIG. 3A illustrates a conventional structure in which the buffer layer 4, protective layer 3, and waveguide layer 2 are formed over the entire surface, FIG. 3B illustrates another conventional structure in which the buffer layer 4 and protective layer 3 in the electrode isolation area are selectively removed, while the waveguide layer 2 is formed over the entire surface, and FIG. 3C illustrates a structure according to the present embodiment in which the buffer layer 4, protective layer 3, and waveguide layer 2 in the electrode isolation area are selectively removed.

FIG. 7A is a cross-sectional view taken along line A-A' in FIG. 6, and FIG. 7B is a cross-sectional view taken along line B-B' in FIG. 6.

FIGS. 9A and 9B are schematic cross-sectional views of the optical modulator 300 illustrated in FIG. 8, in which FIG. 9A is a cross-sectional view taken along line A-A' in FIG. 8, and FIG. 9B is a cross-sectional view taken along line B-B' in FIG. 8.

FIGS. 13A and 13B are plan views illustrating an optical modulator 400 according to a fourth embodiment of the present invention, in which FIG. 13A illustrates only an optical waveguide, and FIG. 13B illustrates the entire configuration of the optical modulator 400 including traveling-wave electrodes.

MODE FOR CARRYING OUT THE INVENTION

Preferred embodiments of the present invention will be described in detail with reference to the accompanying drawings.

Figure 1A:
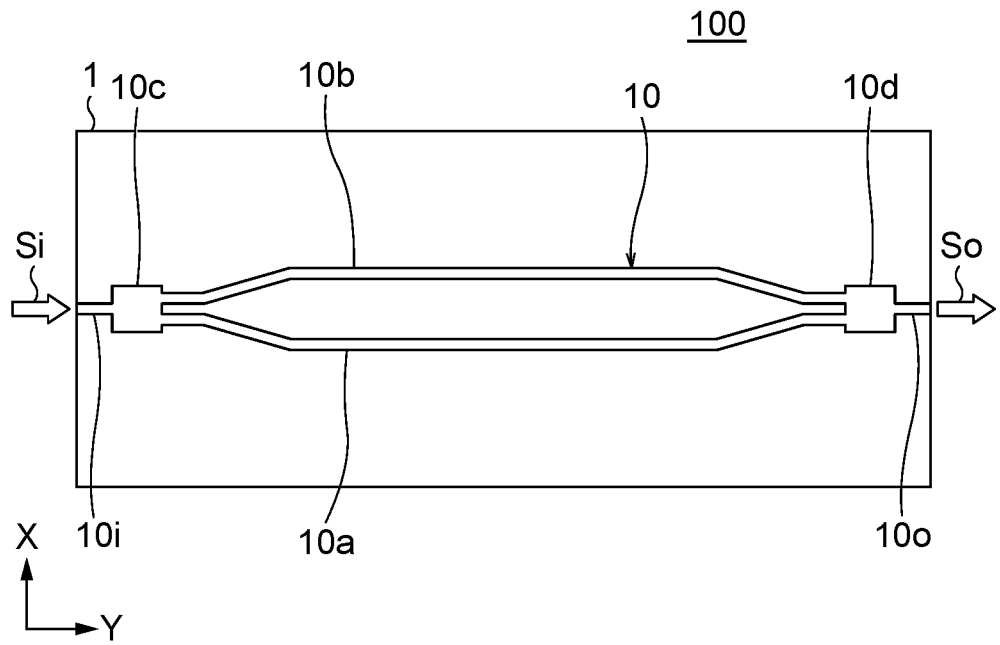
Figure 1B:
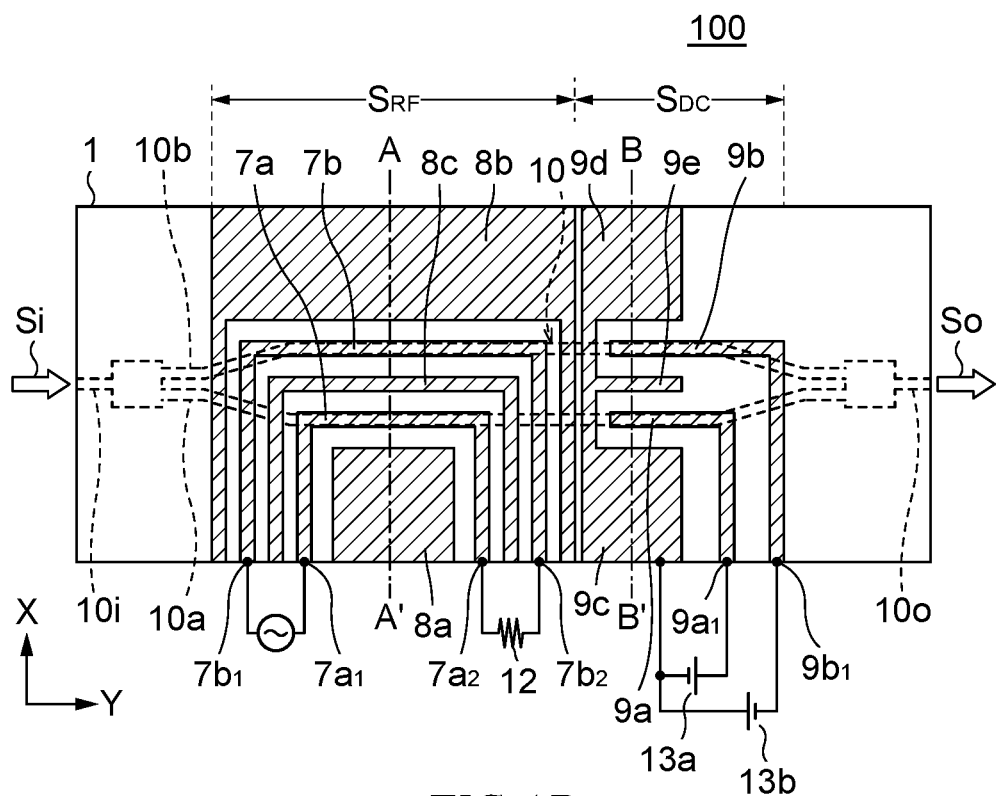

FIGS. 1A and 1B are plan views of an optical modulator 100 according to a first embodiment of the present invention. FIG. 1A illustrates only an optical waveguide, and FIG. 1B illustrates the entire configuration of the optical modulator 100 including traveling-wave electrodes.

As illustrated in FIGS. 1A and 1B, the optical modulator 100 includes a Mach-Zehnder optical waveguide 10 formed on a substrate 1 and having first and second optical waveguides 10a and 10b provided in parallel to each other, an RF part $S_{RF}$ including first and second signal electrodes 7a and 7b provided overlapping the first and second optical waveguides 10a and 10b, respectively, and a DC part $S_{DC}$ including bias electrodes 9a and 9b provided overlapping the first and second optical waveguides 10a and 10b, respectively. The RF part $S_{RF}$ of the optical modulator 100 includes a ground electrode 8a provided adjacent to the first signal electrode 7a, a ground electrode 8b provided adjacent to the second signal electrode 7b, and a ground electrode 8c provided between the first and second signal electrodes 7a and 7b. The DC part $S_{DC}$ of the optical modulator 100 includes a bias electrode 9c provided adjacent to the bias electrode 9a, a bias electrode 9d provided adjacent to the bias electrode 9b, and a bias electrode 9e provided between the bias electrodes 9a and 9b. The bias electrodes 9c, 9d, and 9e are mutually electrically connected and are applied with a reference potential (ground potential).

The Mach-Zehnder optical waveguide 10 is an optical waveguide having a Mach-Zehnder interferometer structure. The Mach-Zehnder optical waveguide 10 has the first and second optical waveguides 10a and 10b which are branched from a single input optical waveguide 10i at a demultiplexer 10c, and the first and second optical waveguides 10a and 10b are combined into a single output optical waveguide 10o at a multiplexer 10d. An input light Si is demultiplexed at the demultiplexer 10c. The demultiplexed lights travel through the first and second optical waveguides 10a and 10b and are then multiplexed at the multiplexer 10d. The multiplexed light is output from the output optical waveguide 10o as a modulated light So.

The first signal electrode 7a is positioned between the two ground electrodes 8a and 8c in a plan view, and the second signal electrode 7b is positioned between the two ground electrodes 8b and 8c in a plan view. One ends $7a_1$ and $7b1$ and the other ends $7a_2$ and $7b_2$ of the first and second signal electrodes 7a and 7b are drawn to one end side of the substrate 1 in the width direction. The one ends $7a_1$ and $7b_1$ of the first and second signal electrodes 7a and 7b each serve as a signal input terminal, and the other ends $7a_2$ and $7b_2$ thereof are connected to each other through a terminal resistor 12. Alternatively, the other end $7a2$ of the first signal electrode 7a may be connected to the ground electrode 8a through a first terminal resistor, and the other end $7b_2$ of the second signal electrode 7b may be connected to the ground electrode 8b through a second terminal resistor. As a result, the first and second signal electrodes 7a and 7b function as a differential coplanar traveling-wave electrode together with the ground electrodes 8a and 8b.

The bias electrodes 9a to 9e are provided independently of the first and second signal electrodes 7a and 7b so as to apply DC bias to the first and second optical waveguides 10a and 10b. One ends $9a_1$ and $9b_1$ of the bias electrodes 9a and 9b are each an input terminal of the DC bias and are connected to DC voltage sources 13a and 13b, respectively. In more detail, one end $9a_1$ of the bias electrode 9a is connected with a positive electrode terminal of the DC voltage source 13a, and one end $9b_1$ of the bias electrode 9b is connected with a negative electrode terminal of the DC voltage source 13b. Thus, the bias electrode 9a and the bias electrodes 9c and 9e provided on both sides of the bias electrode 9a function as a pair of bias electrodes (first and second bias electrodes) for applying a DC bias to the first optical waveguide 10a. Further, the bias electrode 9b and the bias electrodes 9d and 9e provided on both sides of the bias electrode 9b function as a pair of bias electrodes (first and second bias electrodes) for applying a DC bias to the second optical waveguide 10b. One of the DC voltage sources 13a and 13b may be omitted. Although the formation area (DC part $S_{DC}$) of the bias electrodes 9a to 9e is closer to the output terminal side of the Mach-Zehnder optical waveguide 10 than the formation area (RF part $S_{RF}$) of the first and second signal electrodes 7a and 7b is in the present embodiment, it may be closer to the input terminal side.

Differential signals (modulated signals) having the same absolute value but opposite signs are input to the one end $7a_1$ of the first signal electrode 7a and one end $7b_1$ of the second signal electrode 7b. The first and second optical waveguides 10a and 10b are formed of a material, such as lithium niobate, having electro-optic effect, so that the refractive indices of the first and second optical waveguides 10a and 10b are changed with +Δn and −Δn by an electric field applied to the first and second optical waveguides 10a and 10b, with the result that a phase difference between the pair of optical waveguides changes. A signal light modulated by the change in the phase difference is output from the output optical waveguide 10o.

The one end $9a_1$ of the bias electrode 9a is input with a positive DC bias voltage, and the one end $9b_1$ of the bias electrode 9b is input with a negative DC bias voltage. In order to set an appropriate operating point with respect to the modulated signal while following the DC drift, the DC bias is adjusted within a range of several volts to several tens of volts.

As described above, the optical modulator 100 according to the present embodiment is of a dual drive type constituted by the pair of signal electrodes 7a and 7b, so that it is possible to increase the symmetry of the electric field to be applied to the pair of optical waveguides to thereby reduce the wavelength chirp.

Figure 2A:
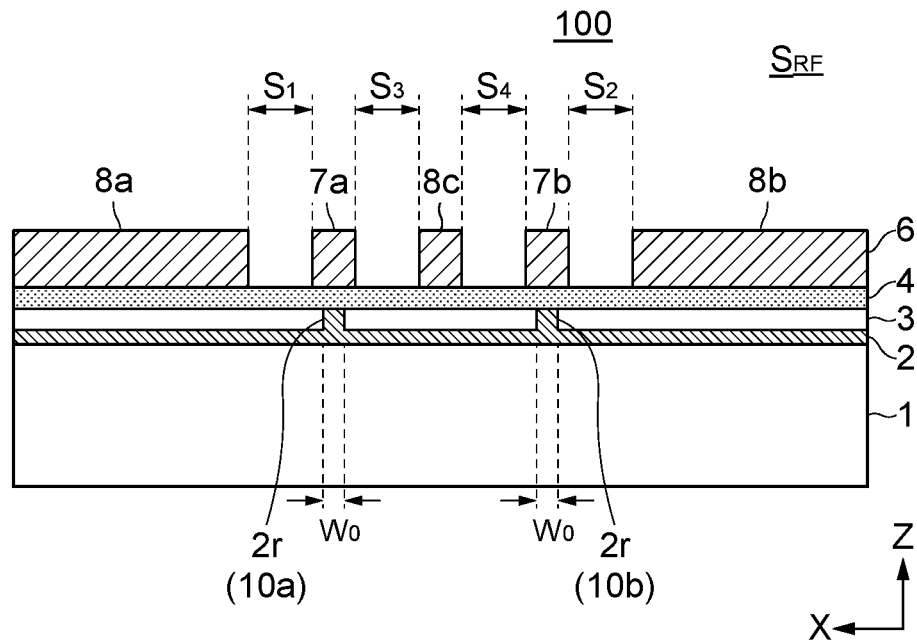
Figure 2B:
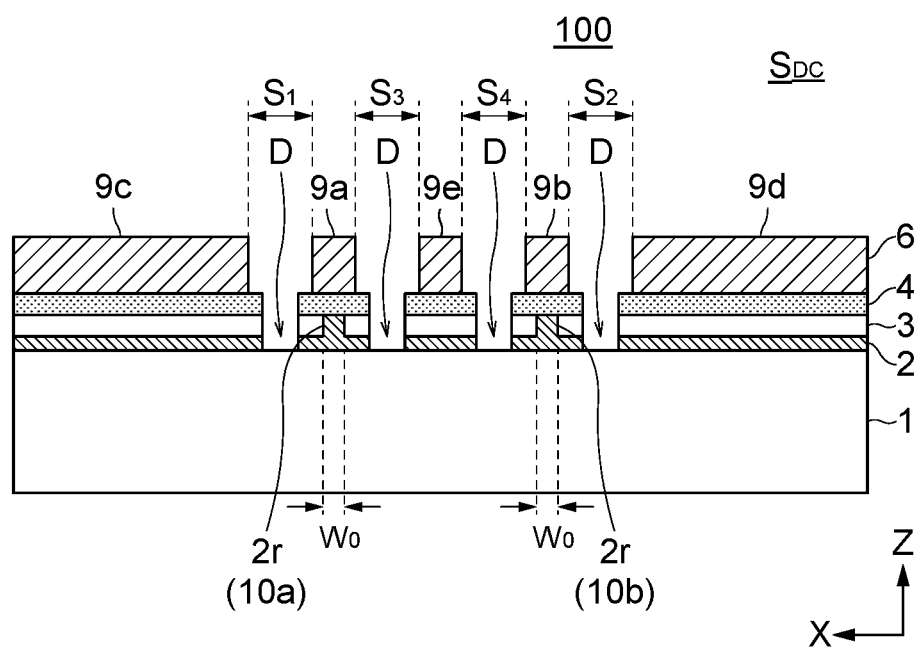

FIGS. 2A and 2B are schematic cross-sectional views of the optical modulator 100 illustrated in FIGS. 1A and 1B. FIG. 2A is a cross-sectional view of the RF part $S_{RF}$ taken along line A-A' in FIG. 1B, and FIG. 2B is a cross-sectional view of the DC part $S_{DC}$ taken along line B-B' in FIG. 1B.

As illustrated in FIG. 2A, the cross-sectional structure of the RF part $S_{RF}$ of the optical modulator 100 according to the present embodiment has a multilayer structure in which the substrate 1, a waveguide layer 2, a buffer layer 4, and an electrode layer 6 are laminated in this order. The substrate 1 is, e.g., a sapphire substrate, and the waveguide layer 2 formed of an electro-optic material, such as a lithium niobate film, is formed on the surface of the substrate 1. The waveguide layer 2 has the first and second optical waveguides 10a and 10b each formed by a ridge part 2r. A width Wo of each of the first and second optical waveguides 10a and 10b can be set to, e.g., 1 μm. Further, a distance between the first and second optical waveguides 10a and 10b adjacent to each other can be set to, e.g., 14 μm.

The protective layer 3 is formed in an area not overlapping the first and second optical waveguides 10a and 10b in a plan view. The protective layer 3 covers the entire area of the upper surface of the waveguide layer 2 excluding portions where the ridge parts 2r are formed, and the side surfaces of each of the ridge parts 2r are also covered with the protective layer 3, so that scattering loss caused due to the roughness of the side surfaces of the ridge part 2r can be prevented. The thickness of the protective layer 3 is substantially equal to the height of the ridge part 2r of the waveguide layer 2. There is no particular restriction on the material of the protective layer 3 and, for example, silicon oxide ($SiO_2$) may be used.

The buffer layer 4 is formed on the upper surfaces of the ridge parts 2r of the waveguide layer 2 so as to prevent light propagating through the first and second optical waveguides 10a and 10b from being absorbed by the first and second signal electrodes 7a and 7b. The buffer layer 4 is preferably formed of a material having a lower refractive index than the waveguide layer 2 and a high transparency, such as $Al_2O_3$, $SiO_2$, $LaAlO_3$, $LaYO_3$, ZnO, $HfO_2$, MgO, or $Y_2O_3$, and the thickness thereof may be about 0.2 μm to 1 μm. The buffer layer 4 is more preferably formed of a material having a high dielectric constant, and it may be formed of the same material as the protective layer 3. That is, the buffer layer 4 may be directly formed on the upper surface of the waveguide layer 2 with the protective layer 3 omitted. In the present embodiment, although the buffer layer 4 covers not only the upper surfaces of the respective first and second optical waveguides 10a and 10b, but also the entire underlying surface including the upper surface of the protective layer 3, it may be patterned so as to selectively cover only the vicinity of the upper surfaces of the first and second optical waveguides 10a and 10b.

The film thickness of the buffer layer 4 is preferably as large as possible in order to reduce the light absorption of an electrode and preferably as small as possible in order to apply a high electric field to the first and second optical waveguides 10a and 10b. The light absorption and applied voltage of an electrode have a trade-off relation, so that it is necessary to set an adequate film thickness according to the purpose. The dielectric constant of the buffer layer 4 is preferably as high as possible, because the higher the dielectric constant thereof, the more $V\pi L$, (index representing electric field efficiency) is reduced. Further, the refractive index of the buffer layer 4 is preferably as low as possible, because the lower the refractive index thereof, the thinner the buffer layer 4 can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The electrode layer 6 is provided with the first and second signal electrodes 7a, 7b and ground electrodes 8a to 8c. The first signal electrode 7a is provided overlapping the ridge part 2r corresponding to the first optical waveguide 10a so as to modulate light traveling inside the first optical waveguide 10a and is opposed to the first optical waveguide 10a through the buffer layer 4. The second signal electrode 7b is provided overlapping the ridge part 2r corresponding to the second optical waveguide 10b so as to modulate light traveling inside the second optical waveguide 10b and is opposed to the second optical waveguide 10b through the buffer layer 4.

The ground electrode 8a (first ground electrode) is positioned on the side opposite to the second optical waveguide 10b (or ground electrode 8c) as viewed from the first signal electrode 7a and is adjacent to the first signal electrode 7a. The ground electrode 8b (second ground electrode) is positioned on the side opposite to the first optical waveguide 10a (or ground electrode 8c) as viewed from the second signal electrode 7b and is adjacent to the second signal electrode 7b. The ground electrode 8c (third ground electrode) is positioned between the first and second signal electrodes 7a and 7b and is adjacent to both the first and second signal electrodes 7a and 7b. The width of the ground electrode 8a may be the same as or different from that of the ground electrode 8b. The width of the ground electrode 8c may be the same as or different from those of the first and second signal electrodes 7a and 7b. Thus, the optical modulator 100 according to the present embodiment has a so-called GSGSG electrode structure ("G" and "S" denote the ground and signal, respectively) in which electrodes are arranged in a direction (X-direction) perpendicular to the traveling direction of the first and second optical waveguides 10a and 10b in the order of ground electrode—signal electrode—ground electrode—signal electrode—ground electrode.

In the cross-sectional structure obtained by vertically cutting the first and second optical waveguides 10a and 10b, an electrode structure in an area sandwiched between the ground electrodes 8a and 8b is left-right symmetric. Thus, the magnitudes of electric fields applied from the first and second signal electrodes 7a and 7b to the respective first and second optical waveguides 10a and 10b can be made the same as much as possible, whereby the wavelength chirp can be reduced.

Although the waveguide layer 2 is not particularly limited in type as long as it is formed of an electro-optic material, it is preferably formed of lithium niobate ($LiNbO_3$). This is because lithium niobate has a large electro-optic constant and is thus suitable as the constituent material of an electro-optic device such as an optical modulator. Hereinafter, the configuration of the present embodiment when the waveguide layer 2 is formed using a lithium niobate film will be described in detail.

Although the substrate 1 is not particularly limited in type as long as it has a lower refractive index than the lithium niobate film, it is preferably a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The term "epitaxial film", as used herein, refers to a monocrystalline film whose crystal orientation is aligned by crystal growth thereof on the underlying monocrystalline substrate or monocrystalline film. That is, the epitaxial film is a film having a single crystal orientation in the film thickness direction and in the film in-plane direction. Assuming that the film surface extends in X-Y plane and that the film thickness direction is Z-axis direction, the crystal of the epitaxial film is uniformly oriented along the X-, Y- and Z-axis. For example, an epitaxial film can be confirmed by measuring the peak intensity at the orientation position by 2θ-θ X-ray diffraction and observing poles.

Specifically, first, in the 2θ-θ X-ray diffraction measurement, all the peak intensities except for the peak intensity on a target surface must be equal to or less than 10%, preferably equal to or less than 5%, of the maximum peak intensity on the target surface. For example, in a c-axis oriented epitaxial lithium niobate film, the peak intensities except for the peak intensity on a (00L) surface are equal to or less than 10%, preferably equal to or less than 5%, of the maximum peak intensity on the (00L) surface. (00L) is a general term for (001), (002) and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity does not increase at a particular angle, and poles cannot be observed. Since LiNbO$_3$ has a trigonal crystal system structure, single-crystal LiNbO$_3$ (014) has 3 poles. For the lithium niobate film, it is known that crystals rotated by 180° about the c-axis are epitaxially grown in a symmetrically coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of Li$_x$Nb$_A$y$O_z$. A denotes an element other than Li, Nb, and O, wherein x ranges from 0.5 to 1.2, preferably 0.9 to 1.05, y ranges from 0 to 0.5, and z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or a combination of two or more of them.

The lithium niobate film preferably has a film thickness of equal to or smaller than 2 μm. This is because a high-quality lithium niobate film having a thickness larger than 2 μm is difficult to form. The lithium niobate film having an excessively small thickness cannot completely confine light in it, allowing the light to penetrate through the substrate 1 and/or the buffer layer 4. Application of an electric field to the lithium niobate film may therefore cause a small change in the effective refractive index of the optical waveguides (10a and 10b). Thus, the lithium niobate film preferably has a film thickness that is at least approximately one-tenth of the wavelength of light to be used.

The lithium niobate film is preferably formed using a film formation method, such as sputtering, CVD or sol-gel process. Application of an electric field in parallel to the c-axis of the lithium niobate that is oriented perpendicular to the main surface of the substrate 1 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a refractive index lower than that of the lithium niobate film and should be suitable for epitaxial growth. For example, a high-quality lithium niobate film can be formed on a clad layer (not illustrated) made of Y$_2$O$_3$.

As a formation method for the lithium niobate film, there is known a method of thinly polishing or slicing the lithium niobate single crystal substrate. This method has an advantage that characteristics same as those of the single crystal can be obtained and can be applied to the present invention.

As illustrated in FIG. 2B, the DC part S$_{DC}$ of the optical modulator 100 has the two bias electrodes 9a and 9b in place of the first and second signal electrodes 7a and 7b and has the bias electrodes 9c, 9d, and 9e in place of the ground electrodes 8a, 8b, and 8c. Further, the cross-sectional structure of the DC part S$_{DC}$ differs from that of the RF part S$_{RF}$ in that waveguide layer removal areas D in each of which at least a part of the waveguide layer 2 is removed are formed respectively in electrode isolation areas S$_1$ to S$_4$ between the bias electrodes 9a and 9c, between the bias electrodes 9a and 9e, between the bias electrodes 9b and 9d, and between the bias electrodes 9b and 9e. Other configurations are the same as those of the cross-sectional structure of the RF part S$_{RF}$.

As illustrated, the bias electrode 9c (second bias electrode) is positioned on the side opposite to the bias electrode 9b (third bias electrode) as viewed from the bias electrode 9a (first bias electrode) and is adjacent to the bias electrode 9a. The bias electrode 9d (fourth bias electrode) is positioned on the side opposite to the bias electrode 9a (first bias electrode) as viewed from the bias electrode 9b (second bias electrode) and is adjacent to the bias electrode 9b. The bias electrode 9e (fifth bias electrode) is positioned between the bias electrodes 9a and 9b and is adjacent to both the bias electrodes 9a and 9b.

In the DC part S$_{DC}$ having the above electrode structure, the waveguide layer removal areas D are provided respectively under the first electrode isolation area S$_1$ between the bias electrodes 9a and 9c, under the second electrode isolation area S$_2$ between the bias electrodes 9b and 9d, under the third electrode isolation area S3 between the bias electrodes 9a and 9e, and under the fourth electrode isolation area S4 between the bias electrodes 9b and 9e.

In the present embodiment, the waveguide layer removal area D is an area in which the buffer layer 4, protective layer 3, and waveguide layer 2 are removed and, thereby, the upper surface of the substrate 1 is exposed. As illustrated, the waveguide layer removal area D need not be formed over the entire width direction (X-direction) of each of the electrode isolation area S$_1$ to S$_4$, but may be formed only at the center portion in the width direction. This allows a state where the side surfaces of the ridge part 2r are covered with the protective layer 3 to be maintained. Further, the waveguide layer removal area D is preferably formed over the entire length of the bias electrodes 9a and 9b in the wiring direction (Y direction), but may not necessarily be formed over the entire length in the wiring direction.

Figure 3A:
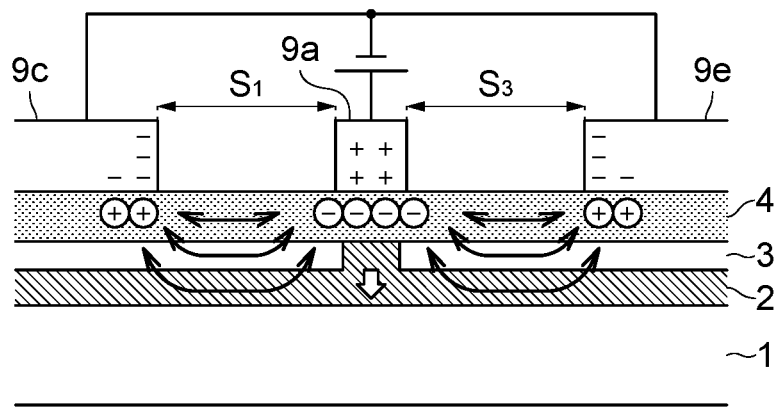
Figure 3B:
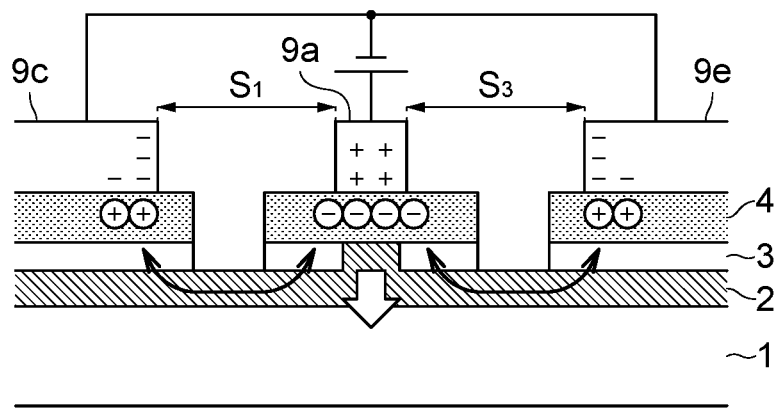
Figure 3C:
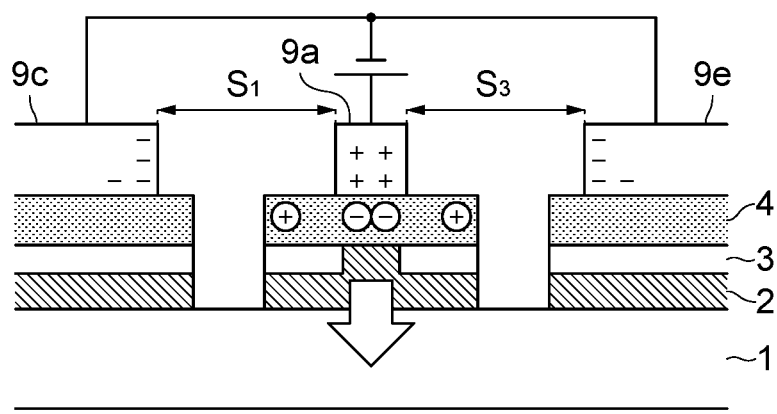

FIGS. 3A to 3C are views for explaining the action of the waveguide layer removal area D. FIG. 3A illustrates a conventional structure in which the buffer layer 4, protective layer 3, and waveguide layer 2 are formed over the entire surface, FIG. 3B illustrates another conventional structure in which the buffer layer 4 and protective layer 3 in the electrode isolation area are selectively removed, while the waveguide layer 2 is formed over the entire surface, and FIG. 3C illustrates a structure according to the present embodiment in which the buffer layer 4, protective layer 3, and waveguide layer 2 in the electrode isolation area are selectively removed.

As illustrated in FIG. 3A, in the conventional structure in which the buffer layer 4, protective layer 3, and waveguide layer 2 are formed over the entire surface of the substrate 1 including the electrode isolation areas S$_1$ and S$_3$, the DC drift is significant. Although the fundamental cause of the DC drift has not been made clear, it is considered that, as illustrated, mobile ions such as Li, Na, and K in a dielectric are gradually moved through continuous application of a DC bias between a pair of electrodes and accumulate in an area near the electrodes, whereby the DC bias is canceled by the ions.

Further, as illustrated in FIG. 3B, the structure in which the buffer layer 4 and protective layer 3 under the respective electrode isolation areas S$_1$ and S$_3$ are selectively removed is more advantageous in suppressing the DC drift than the structure illustrated in FIG. 3A. However, the waveguide layer 2 serves as a moving path for the ions, so that it cannot be said that a sufficient DC drift suppressing effect is obtained.

On the other hand, as illustrated in FIG. 3C, in the structure according to the present embodiment in which the waveguide layer 2 under the respective electrode isolation areas $S_1$ and $S_3$ is selectively removed together with the buffer layer 4 and protective layer 3, the moving path for the mobile ions is divided, thus making it possible to prevent the movement of the mobile ions between the bias electrode 9a and the bias electrodes 9c, 9e. Therefore, the DC drift suppressing effect can be enhanced to make it possible to prolong the lifetime of an optical modulator.

Although it is possible to remove the buffer layer 4 under the electrode isolation area in conventional optical modulators using a lithium niobate crystal substrate, it is not possible to divide the moving path for the ions inside the substrate. Thus, it is extremely difficult to divide the moving path for the mobile ions. However, in the optical modulator 100 according to the present embodiment, the pair of optical waveguides 10a and 10b is formed of a thin lithium niobate film, so that it is possible to easily remove a part of the waveguide layer 2 formed of the lithium niobate film that does not function as the optical waveguide, whereby a device structure suppressing the DC drift can be easily achieved.

As illustrated in FIG. 2A, in the RF part $S_{RF}$, the waveguide layer 2 existing under the respective electrode isolation areas $S_1$ to $S_4$ between the signal electrode 7a and the ground electrode 8a, between the signal electrode 7a and the ground electrode 8c, between the signal electrode 7b and the ground electrode 8b, and between the signal electrode 7b and the ground electrode 8c is not removed. This is because if the waveguide layer 2 is removed in the RF part $S_{RF}$, efficiency of an electric field to be applied to the optical waveguides 10a and 10b is deteriorated to increase a half-wavelength voltage. Therefore, the waveguide layer 2 preferably exists in the electrode isolation areas $S_1$ to $S_4$ (fifth to eighth electrode isolation areas) of the RF part $S_{RF}$, and the waveguide layer 2 is removed only in the DC part $S_{DC}$.

As described above, if the waveguide layer 2 under the electrode isolation area is removed in the RF part $S_{RF}$, the electric field efficiency with respect to the optical waveguides 10a and 10b is deteriorated, so that, in conventional optical modulators, the waveguide layer 2 is provided over the entire surface including the electrode isolation area in both the RF part $S_{RF}$ and DC part $S_{DC}$. However, in the present embodiment, the waveguide layer 2 in the electrode isolation area is removed in the DC part $S_{DC}$. Thus, by actively adopting a structure different from the RF part $S_{RF}$, the DC drift suppressing effect can be enhanced.

Figure 4A:
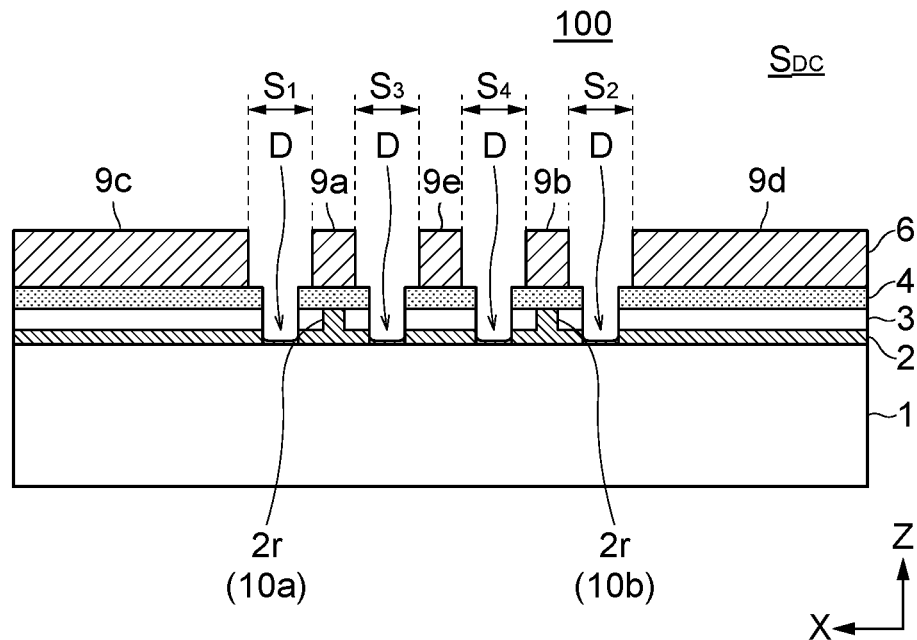
FIGS. 4A and 4B are schematic cross-sectional views illustrating modifications of the cross-sectional structure of the DC part $S_{DC}$ of the optical modulator 100.
Figure 4B:
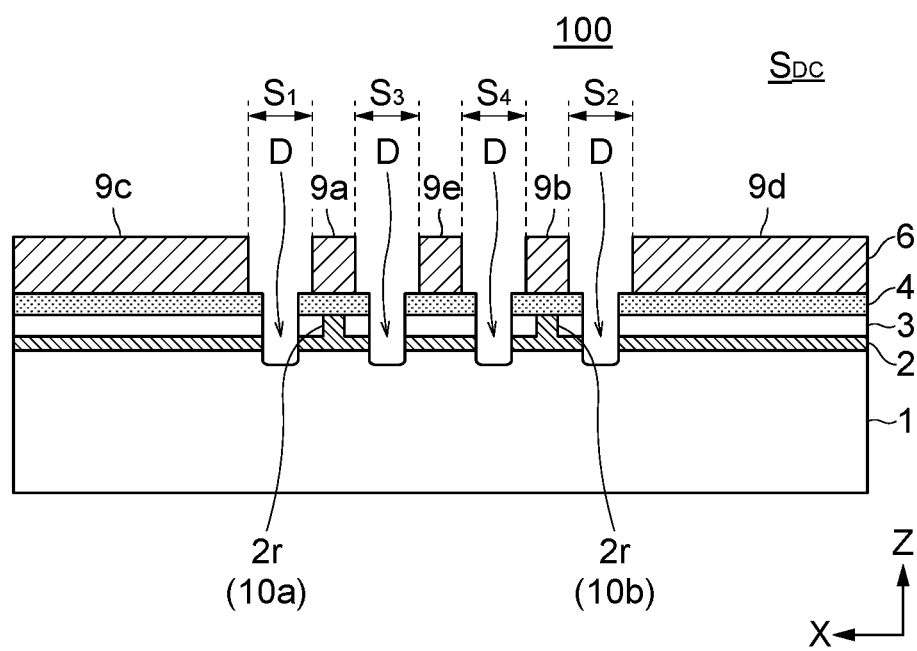

FIGS. 4A and 4B are schematic cross-sectional views illustrating modifications of the cross-sectional structure of the DC part $S_{DC}$ of the optical modulator 100.

As illustrated in FIG. 4A, in the DC part $S_{DC}$ of the optical modulator 100, the waveguide layer 2 may not be entirely but partially removed in the thickness direction (Z-direction) thereof in the waveguide layer removal area D. In this case, the upper surface of the substrate 1 is not exposed but covered with the residue of the waveguide layer 2. The thickness of the residue of the waveguide layer 2 covering the upper surface of the substrate 1 in the waveguide layer removal area D is smaller than the thickness (slab thickness of the waveguide layer 2) of the waveguide layer 2 in an area other than the waveguide layer removal area D. Even when the optical modulator 100 is thus configured, the DC drift suppressing effect can be obtained.

Further, as illustrated in FIG. 4B, in the DC part $S_{DC}$ of the optical modulator 100, the waveguide layer 2 may be removed over the entire thickness direction (Z-direction) thereof in the waveguide layer removal area D, and a part (surface layer) of the substrate 1 may further be removed. Even when the optical modulator 100 is thus configured, the DC drift suppressing effect can be obtained.

Figure 5A:
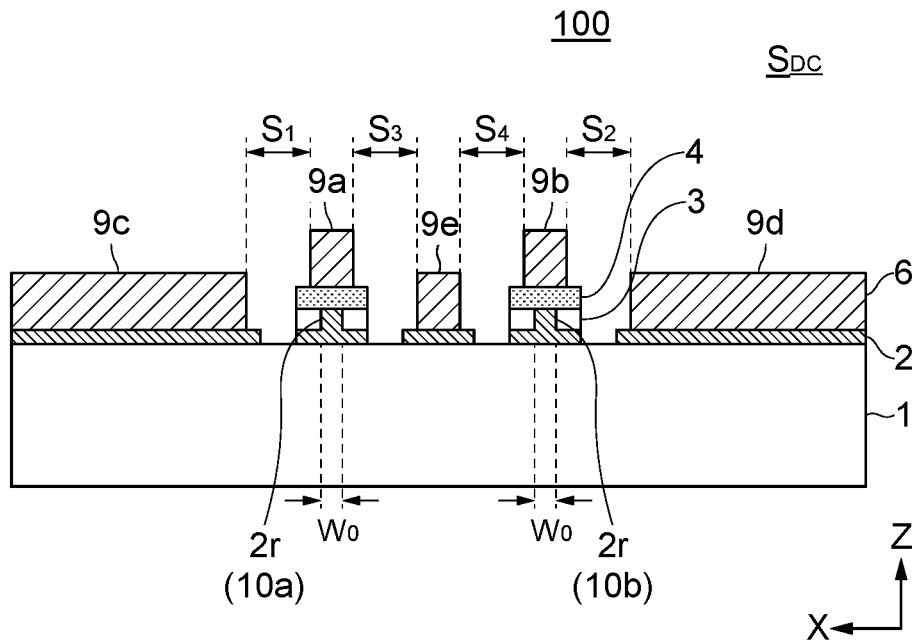
FIGS. 5A and 5B are schematic cross-sectional views illustrating other modifications of the cross-sectional structure of the DC part $S_{DC}$ of the optical modulator 100.
Figure 5B:
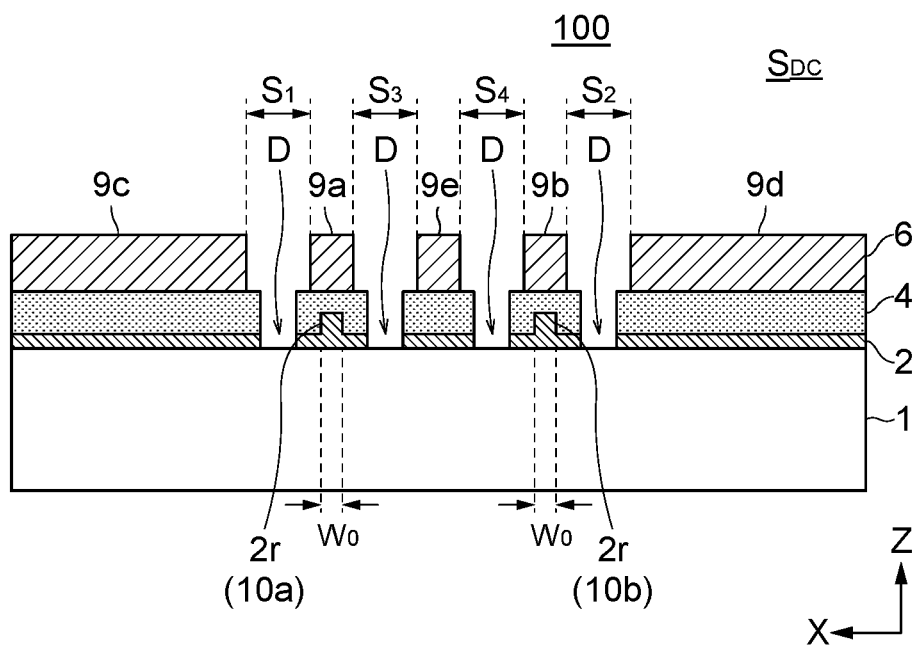

FIGS. 5A and 5B are schematic cross-sectional views illustrating other modifications of the cross-sectional structure of the DC part $S_{DC}$ of the optical modulator 100.

As illustrated in FIG. 5A, in the DC part $S_{DC}$ of the optical modulator 100, the buffer layer 4 and protective layer 3 may be formed only above the pair of optical waveguides 10a and 10b and may be removed in the other area. With this structure, the bias electrodes 9c to 9e are formed on the upper surface of the waveguide layer 2. The electrode structure of the DC part $S_{DC}$ of this optical modulator 100 is adopted in accordance with the electrode structure of the RF part $S_{RF}$.

Even when the optical modulator 100 is thus configured, the DC drift suppressing effect can be obtained.

Further, as illustrated in FIG. 5B, as well as the not-shown RF part $S_{RF}$, the DC part $S_{DC}$ of the optical modulator 100 may have a structure in which the protective layer 3 is omitted. In this case, the buffer layer 4 is formed on the entire surface of the waveguide layer 2, and thus not only the upper surface of the ridge part 2r of the waveguide layer 2, but also the side surfaces thereof are covered with the buffer layer 4. Even when the optical modulator 100 is thus configured, the DC drift suppressing effect can be obtained.

As described above, the optical modulator 100 according to the present embodiment adopts an independent bias type in which the RF part $S_{RF}$ that applies a modulated signal to the pair of optical waveguides 10a and 10b and the DC part $S_{DC}$ that applies a DC bias thereto are provided independently of each other, wherein the DC part $S_{DC}$ includes the bias electrodes 9a and 9b opposed respectively to the first and second optical waveguides 10a and 10b through the buffer layer 4 and the bias electrodes 9c, 9d, and 9e provided adjacent to the bias electrodes 9a and 9b, and the waveguide layer removal areas D in which at least a part of the waveguide layer 2 is removed together with the buffer layer 4 and protective layer 3 are provided in the first to fourth electrode isolation areas $S_1$ to $S_4$ between the bias electrodes 9a and 9c, between the bias electrodes 9a and 9e, between the bias electrodes 9b and 9d, and between the bias electrodes 9b and 9e. With this configuration, it is possible to prevent the movement of the mobile ions to suppress the DC drift.

Figure 6:
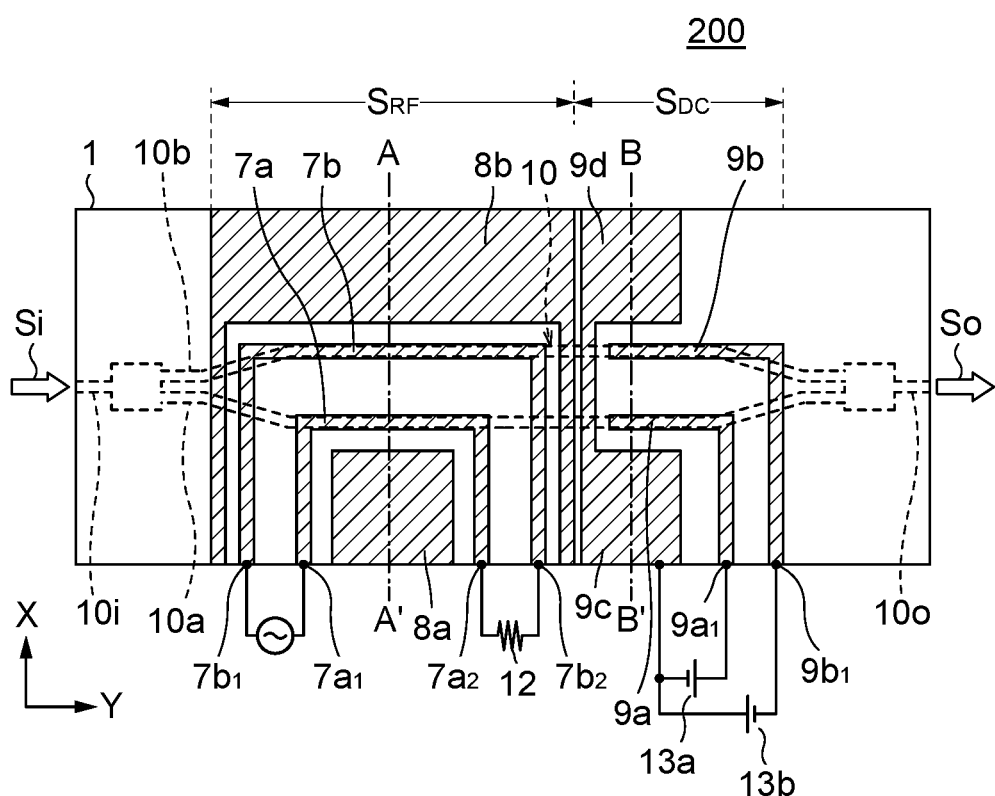
FIG. 6 is a plan view of an optical modulator 200 according to a second embodiment of the present invention, which particularly illustrates the entire configuration of the optical modulator 200 including traveling-wave electrodes.

FIG. 6 is a plan view of an optical modulator 200 according to a second embodiment of the present invention, which particularly illustrates the entire configuration of the optical modulator 200 including traveling-wave electrodes.

As illustrated in FIG. 6, the optical modulator 200 is featured in that the ground electrode 8c is not provided between the first and second signal electrodes 7a and 7b in a plan view and that the bias electrode 9e is not provided between the bias electrodes 9a and 9b in a plan view. That is, the optical modulator 200 according to the present embodiment has a so-called GSSG electrode structure in which electrodes are arranged in a direction (X-direction) perpendicular to the traveling direction of the first and second optical waveguides 10a and 10b in the order of ground electrode—signal electrode—signal electrode—ground electrode. Other configurations are the same as those of the first embodiment.

Figure 7A:
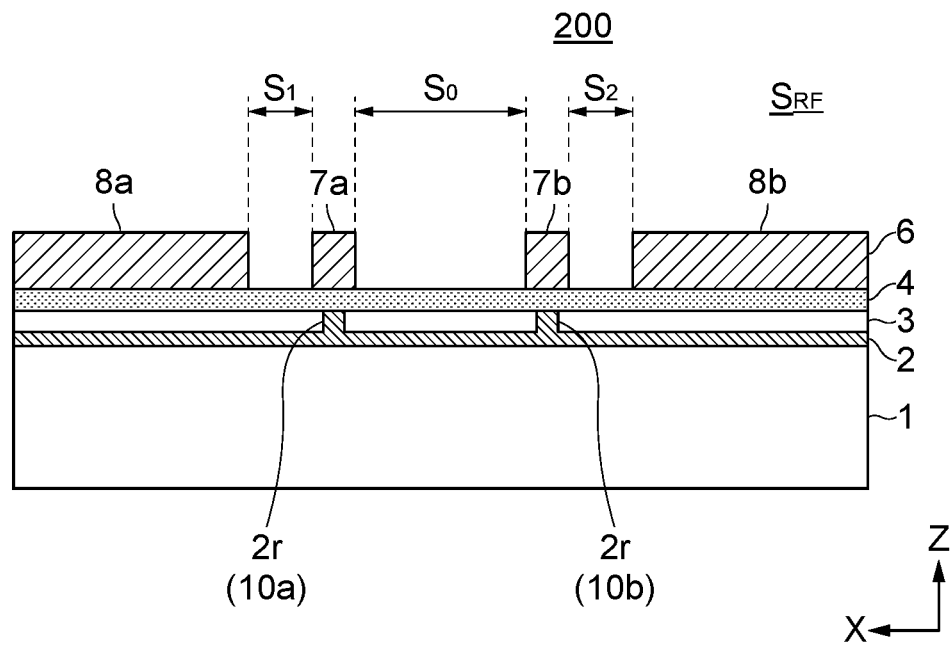
FIGS. 7A and 7B are schematic cross-sectional views of the optical modulator 200 illustrated in FIG. 6.
Figure 7B:
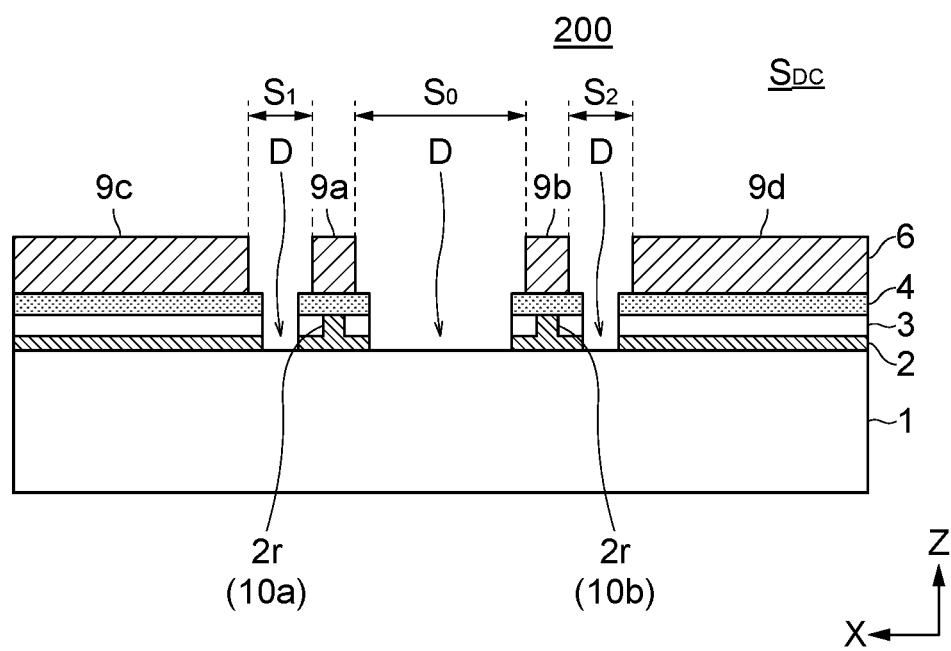

FIGS. 7A and 7B are schematic cross-sectional views of the optical modulator 200 illustrated in FIG. 6. FIG. 7A is a cross-sectional view taken along line A-A' in FIG. 6, and FIG. 7B is a cross-sectional view taken along line B-B' in FIG. 6.

As illustrated in FIG. 7B, the optical modulator 200 is featured in that the waveguide layer removal area D is also provided under an electrode isolation area $S_0$ between the bias electrodes 9a and 9b. It is the same as the first embodiment that the waveguide layer removal area D is provided under the electrode isolation area $S_1$ between the bias electrodes 9a and 9c and under the electrode isolation area $S_2$ between the bias electrodes 9b and 9d and that the waveguide layer 2 existing under the electrode isolation areas $S_1$ and $S_2$ of the RF part $S_{RF}$ is not removed as illustrated in FIG. 7A.

In the configuration of FIG. 7B, when a distance between the bias electrodes 9a and 9b is sufficiently large, it is possible to leave the waveguide layer 2 under the electrode isolation area $S_0$ and to provide the waveguide layer removal area D only under the electrode isolation areas $S_1$ and $S_2$. This is because the movement of the mobile ions occurs between the bias electrode 9a (first bias electrode) and the bias electrode 9c (second bias electrode) or between the bias electrode 9b (third bias electrode) and the bias electrode 9d (fourth bias electrode) and hardly occurs between the bias electrodes 9a and 9b. Further, when a distance between the bias electrodes 9a and 9c and a distance between the bias electrodes 9b and 9d are sufficiently large, it is possible to leave the waveguide layer 2 under the electrode isolation areas $S_1$ and $S_2$ and to provide the waveguide layer removal area D only under the electrode isolation area $S_0$.

The optical modulator 200 according to the present embodiment can provide the same effect as provided by the optical modulator 100 according to the first embodiment. That is, the optical modulator 200 according to the present embodiment adopts an independent bias type in which the RF part $S_{RF}$ and the DC part $S_{DC}$ are provided independently of each other, wherein the DC part $S_{DC}$ includes the two bias electrodes 9a and 9b opposed respectively to the first and second optical waveguides 10a and 10b through the buffer layer 4 and the bias electrodes 9c and 9d provided adjacent respectively to the two bias electrodes 9a and 9b, and the waveguide layer removal areas D in which at least a part of the waveguide layer 2 is removed together with the buffer layer 4 and protective layer 3 are provided under the electrode isolation area $S_1$ (first electrode isolation area) between the bias electrodes 9a and 9c and under the electrode isolation area $S_2$ (second electrode isolation area) between the bias electrodes 9b and 9d. With this configuration, it is possible to prevent the movement of the mobile ions to suppress the DC drift.

Figure 8:
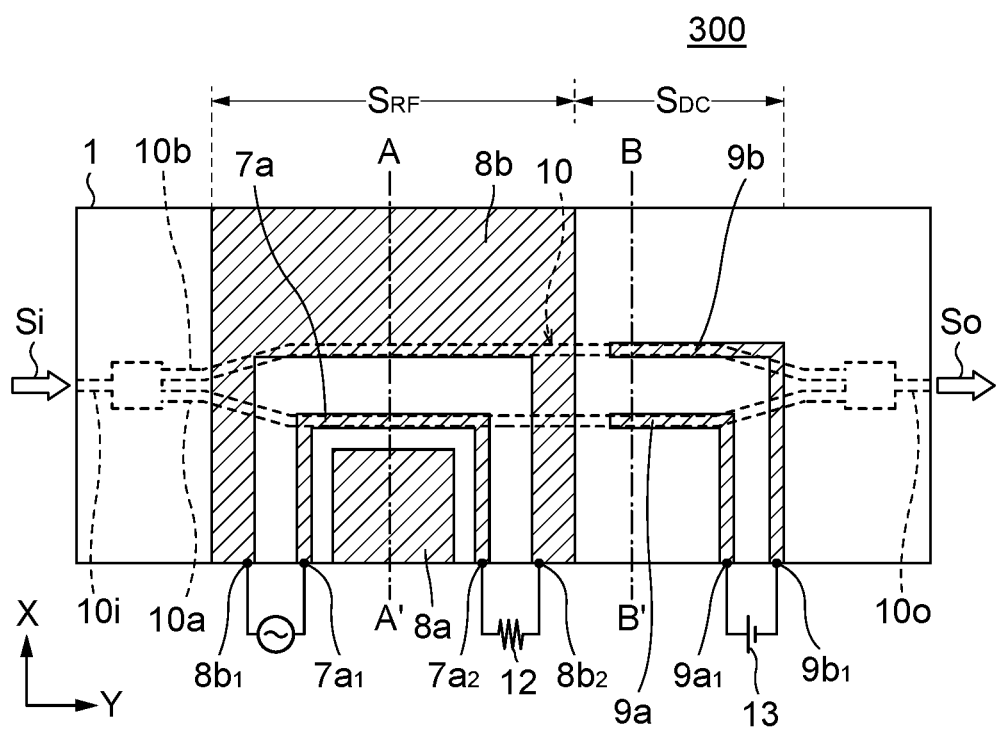
FIG. 8 is a plan view of an optical modulator 300 according to a third embodiment of the present invention, which particularly illustrates the entire configuration of the optical modulator 300 including traveling-wave electrodes.

FIG. 8 is a plan view of an optical modulator 300 according to a third embodiment of the present invention, which particularly illustrates the entire configuration of the optical modulator 300 including traveling-wave electrodes.

As illustrated in FIG. 8, the optical modulator 300 is featured in that it has the signal electrode 7a provided overlapping the first optical waveguide 10a and the ground electrodes 8a and 8b provided on both sides of the signal electrode 7a, the ground electrode 8b of the RF part $S_{RF}$ being provided overlapping the second optical waveguide 10b in a plan view. That is, the optical modulator 300 according to the present embodiment has a so-called GSG electrode structure in which the signal electrode and the ground electrode are provided respectively above the pair of optical waveguides 10a and 10b and is of a so-called single drive type having a single signal electrode.

Further, in the present embodiment, the bias electrodes 9c and 9d are not provided on both sides of the bias electrodes 9a and 9b of the DC part $S_{DC}$. The positive electrode terminal of the DC voltage source is connected to the one end $9a_1$ of the bias electrode 9a, and the negative electrode terminal of the DC voltage source 13 is connected to the one end $9b_1$ of the bias electrode 9b. Other configurations are the same as those of the first embodiment.

Figure 9A:
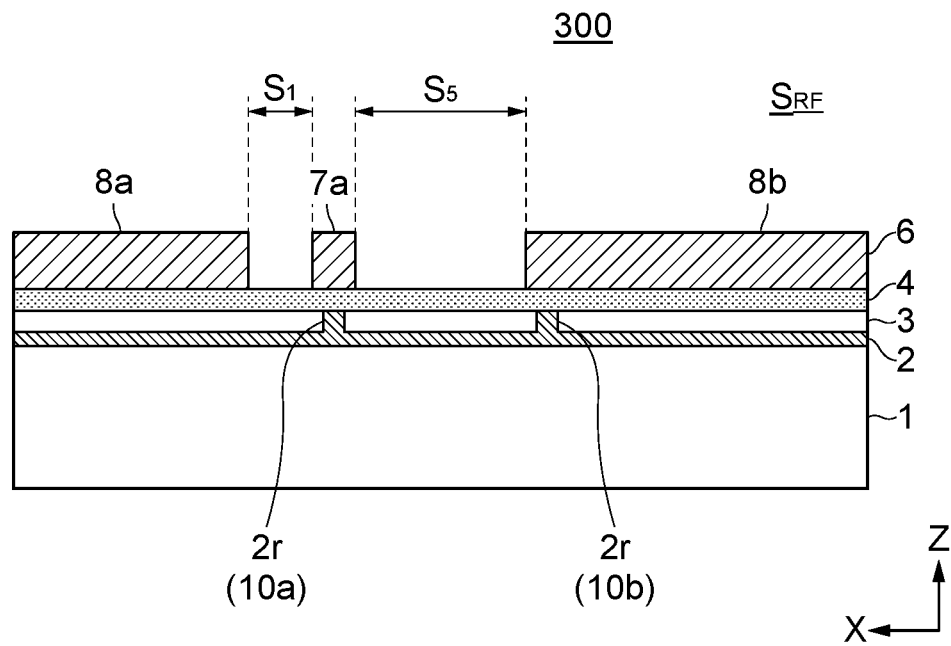
Figure 9B:
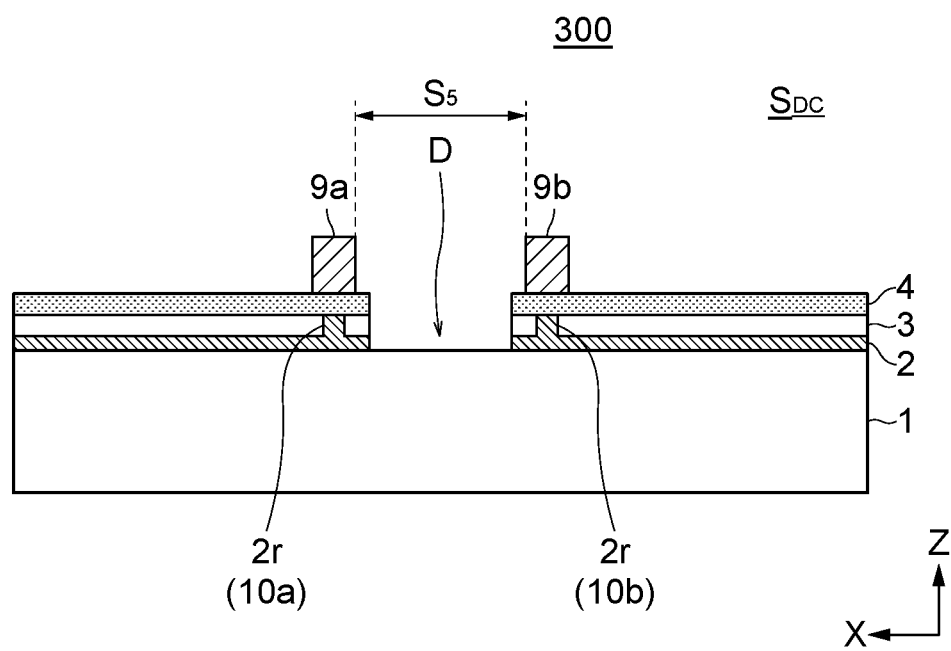

FIGS. 9A and 9B are schematic cross-sectional views of the optical modulator 300 illustrated in FIG. 8. FIG. 9A is a cross-sectional view taken along line A-A' in FIG. 8, and FIG. 9B is a cross-sectional view taken along line B-B' in FIG. 8.

As illustrated in FIG. 9B, the optical modulator 300 is featured in that the waveguide layer 2 under an electrode isolation area $S_5$ (inter-electrode area) between the bias electrodes 9a and 9b of the DC part $S_{DC}$ is removed. This is because it is necessary to prevent the movement of the mobile ions occurring between the pair of bias electrodes 9a and 9b. It is the same as the first embodiment that the waveguide layer 2 of the RF part $S_{RF}$ existing under the electrode isolation areas $S_1$ and $S_5$ between the signal electrode 7a and the ground electrode 8a and between the signal electrode 7a and the ground electrode 8b is not removed as illustrated in FIG. 9A.

The optical modulator 300 according to the present embodiment can provide the same effect as provided by the optical modulator 100 according to the first embodiment. That is, the optical modulator 300 according to the present embodiment adopts an independent bias type in which the RF part $S_{RF}$ and the DC part $S_{DC}$ are provided independently of each other, wherein the DC part $S_{DC}$ includes the bias electrode 9a opposed to the first optical waveguide 10a through the buffer layer 4 and the bias electrode 9b opposed to the second optical waveguide 10b through the buffer layer 4, and the waveguide layer removal area D in which at least a part of the waveguide layer 2 is removed together with the buffer layer 4 and protective layer 3 is provided under the electrode isolation area $S_5$ (fifth electrode isolation area) between the bias electrodes 9a and 9b. With this configuration, it is possible to prevent the movement of the mobile ions to suppress the DC drift.

Figure 10:
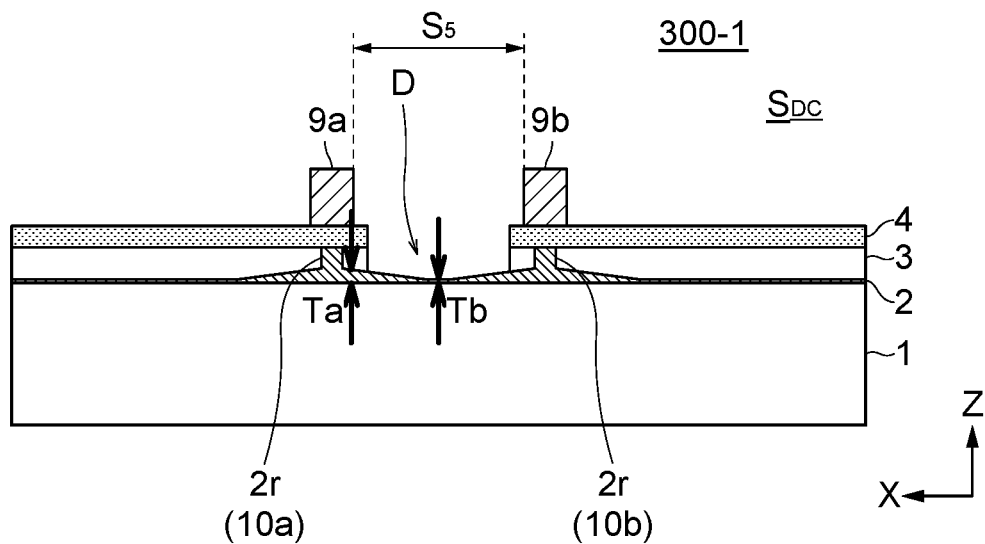
FIG. 10 is a schematic cross-sectional views taken along line B-B' in FIG. 8, which illustrate a first modification of the optical modulator illustrated in FIGS. 9A and 9B.
Figure 11:
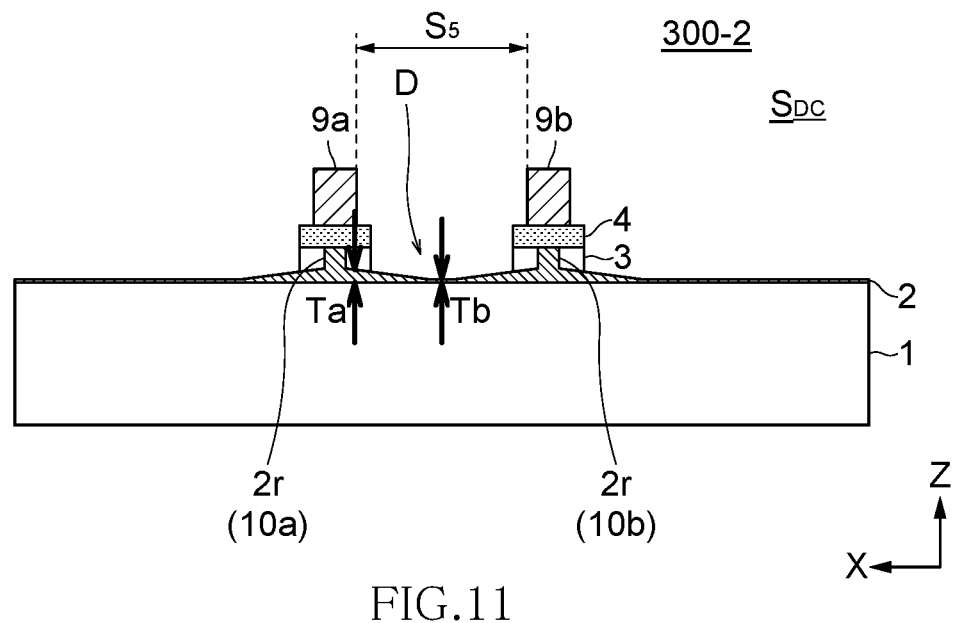
FIG. 11 is a schematic cross-sectional view taken along line B-B' in FIG. 8, which illustrate a second modification of the optical modulator illustrated in FIGS. 9A and 9B.
Figure 12:
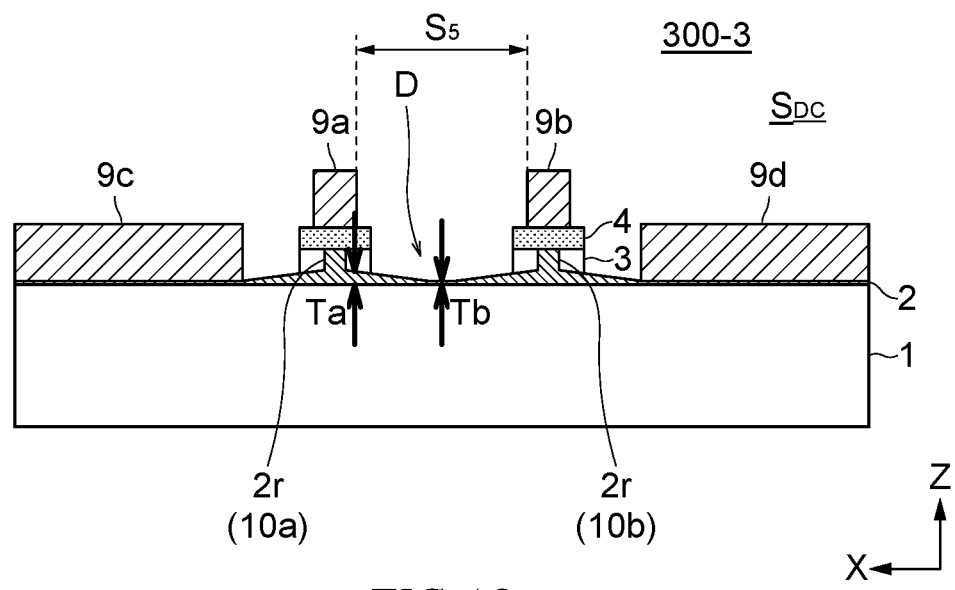
FIG. 12 is a schematic cross-sectional view taken along line B-B' in FIG. 8, which illustrate a third modification of the optical modulator illustrated in FIGS. 9A and 9B.

FIGS. 10 to 12 are schematic cross-sectional views taken along line B-B' in FIG. 8, which illustrate modifications of the optical modulator illustrated in FIGS. 9A and 9B.

An optical modulator 300-1 illustrated in FIG. 10 is featured in that although, in the DC part $S_{DC}$, the waveguide layer existing under the electrode isolation area $S_5$ (inter-electrode area) between the bias electrodes 9a and 9b is not removed unlike the way as illustrated in FIG. 9B, the thickness (slab thickness of the waveguide layer 2) of the waveguide layer 2 at a portion other than the ridge part 2r is gradually reduced as the distance from the ridge part 2r increases. The thickness of the waveguide layer 2 at that portion becomes constant (or zero) at a position distanced from the ridge part 2r by at least a certain value and is not further reduced. With such a configuration of the waveguide layer 2, assuming that the minimum thickness of the waveguide layer 2 between the electrode isolation area $S_5$ and the first optical waveguide 10a (or second optical waveguide 10b) is Ta (>0) and that the minimum thickness of the waveguide layer 2 in the electrode isolation area $S_5$ is Tb (≥0), Ta>Tb is satisfied.

The cross-sectional shape of the waveguide layer 2 as in the present embodiment may be formed during processing of the waveguide layer 2 for formation of the ridge part 2r or may be formed by processing applied after the formation of the ridge part 2r. Although the optical waveguides 10a and 10b are connected to each other through the waveguide layer 2, it is possible to prevent the movement of the mobile ions to suppress the DC drift since the slab thickness of the waveguide layer 2 is very small in the electrode isolation area $S_5$.

An optical modulator 300-2 illustrated in FIG. 11 is featured in that, in the configuration of the DC part $S_{DC}$ in FIG. 10, the buffer layer 4 and the protective layer 3 are formed only in the vicinity of the pair of optical waveguides 10a and 10b and are removed in other areas. That is, in the configuration of FIG. 10, the protective layer 3 and the buffer layer 4 on the side opposite to the electrode isolation area $S_5$ are also selectively removed, and the upper surface of the thinned waveguide layer 2 is exposed. Although the optical waveguides 10a and 10b are connected to each other through the waveguide layer 2, it is possible to prevent the movement of the mobile ions to suppress the DC drift since the slab thickness of the waveguide layer 2 is very small in the electrode isolation area $S_5$.

An optical modulator 300-3 illustrated in FIG. 12 is featured in that, in the configuration of the DC part $S_{DC}$ in FIG. 11, the bias electrodes 9c and 9d are directly formed on the exposed upper surface of the waveguide layer 2. That is, the optical modulator 300-3 has a configuration similar to that of the optical modulator 100 illustrated in FIG. 5A. Although the optical waveguides 10a and 10b are connected to each other through the waveguide layer 2, it is possible to prevent the movement of the mobile ions to suppress the DC drift since the slab thickness of the waveguide layer 2 is very small in the electrode isolation area $S_5$.

Figure 13A:
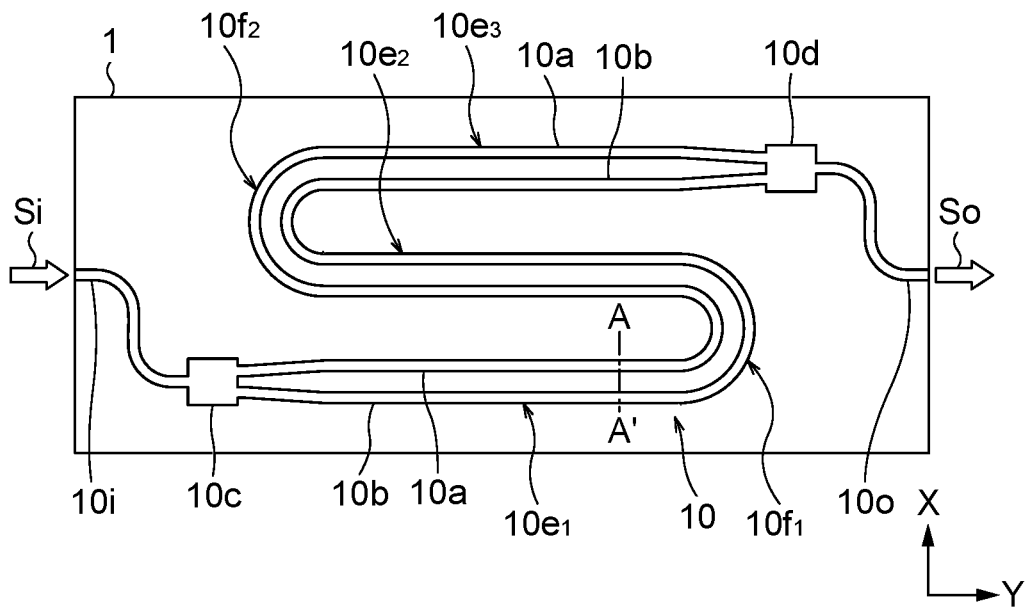
Figure 13B:
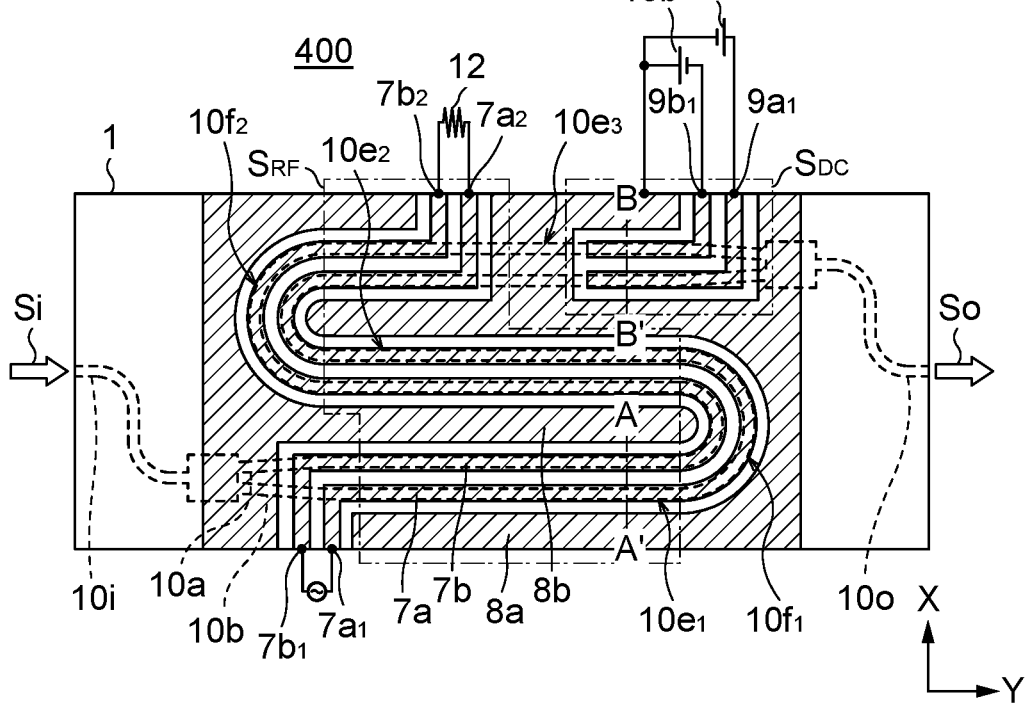

FIGS. 13A and 13B are plan views illustrating an optical modulator 400 according to a fourth embodiment of the present invention. FIG. 13A illustrates only an optical waveguide, and FIG. 13B illustrates the entire configuration of the optical modulator 400 including traveling-wave electrodes.

As illustrated in FIGS. 13A and 13B, the optical modulator 400 according to the present embodiment is featured in that the Mach-Zehnder optical waveguide 10 is constructed by a combination of a linear section and a curved section. Specifically, the Mach-Zehnder optical waveguide 10 has first to third linear sections 10e1, 10e2, and 10e3 arranged parallel to one another, a first curved section 10f1 connecting the first and second linear sections 10e1 and 10e2, and a second curved section 10f2 connecting the second and third linear sections 10e2 and 10e3.

In the optical modulator 400 according to the present embodiment, the cross-sectional structures of the respective linear sections 10e1, 10e2, and 10e3 of the Mach-Zehnder optical waveguide 10 taken along line A-A' in FIGS. 13A and 13B are each formed into those illustrated in, e.g., FIG. 2A. Further, the cross-sectional structure of the linear section 10e3 of the Mach-Zehnder optical waveguide 10 taken along line B-B' is formed into those illustrated in, e.g., FIG. 2B. That is, the RF part $S_{RF}$ is provided at a position overlapping parts of the first to third linear sections 10e1, 10e2, and 10e3 in a plan view, and the DC part $S_{DC}$ is provided at a position overlapping another parts of the first to third linear sections 10e1, 10e2, and 10e3 in a plan view. In place of the cross-sectional structures of FIGS. 2A and 2B, the cross-sectional structures of FIGS. 7A and 7B or FIGS. 9A and 9B may be adopted for example.

In the present embodiment, the input light Si is input to one end of the first linear section $10e_1$, travels from the one end of the first linear section $10e_1$ toward the other end thereof, makes a U-turn at the first curved section $10f_1$, travels from one end of the second linear section $10e_2$ toward the other end thereof in the direction opposite to the first linear section $10e_1$, makes a U-turn at the second curved section $10f_2$, and travels from one end of the third linear section $10e_3$ toward the other end thereof in the same direction as the first linear section $10e_1$.

The optical modulator has a problem of a long element length in practical applications. However, by folding the optical waveguide as illustrated, the element length can be significantly reduced, obtaining a remarkable effect. Particularly, the optical waveguide formed of the lithium niobate film is featured in that it has a small loss even when the curvature radius thereof is reduced up to about 50 μm and is thus suitable for the present embodiment.

While the preferred embodiments of the present invention have been described, the present invention is not limited to the above embodiments, and various modifications may be made within the scope of the present invention, and all such modifications are included in the present invention.

For example, in the above embodiments, the optical modulator has the pair of optical waveguides 10a and 10b each formed of the lithium niobate film epitaxially grown on the substrate 1; however, the present invention is not limited to such a structure, but the optical waveguides may be formed of an electro-optic material such as barium titanate or lead zirconium titanate. However, the optical waveguide formed of the lithium niobate film can be reduced in width, so that the electric field concentration is conspicuously achieved, and the effects of the present invention are great. Further, as the waveguide layer 2, a semiconductor material, a polymer material, or the like having electro-optic effect may be used.

Further, the above-described embodiments can be combined as necessary. Thus, for example, the waveguide layer 2 (see FIG. 10 and the like) gradually reduced in thickness as the distance from the ridge part 2r increases can be adopted in an optical modulator having the so-called GSGSG electrode structure illustrated in FIGS. 5A and 5B or GSSG electrode structure illustrated in FIGS. 7A and 7B.

EXAMPLES

An acceleration test as to the DC drift was carried out for the optical modulators according to Comparative Examples and Examples. In this acceleration test, a change in drift amount Vdrift/Vbias when a DC bias Vbias was continued to be applied for 24 hours under a high temperature of 140° C. was determined.

Optical modulators according to Comparative Examples 1A and 1B each have the cross-sectional structure of FIG. 3A, that is, they each have a conventional structure in which the waveguide layer and buffer layer are formed over the entire surface. The buffer layer of Comparative Example 1A is formed of an oxide La—Al—O (composition A) containing La and Al as main components, and the buffer layer of Comparative Example 1B is formed of an oxide Si—In—O (composition B) containing Si and In as main components.

Optical modulators according to Comparative Examples 2A and 2B each have the cross-sectional structure of FIG. 3B, that is, they each have a conventional structure in which the buffer layer between the electrodes is removed, while the waveguide layer is formed over the entire surface. The buffer layer of Comparative Example 2A is formed of the oxide (composition A) containing La and Al as main components, and the buffer layer of Comparative Example 1B is formed of the oxide (composition B) containing Si and In as main components.

Optical modulators according to Examples 1A and 1B each have the cross-sectional structure of FIG. 2B and FIG. 3C, that is, they each have a structure in which the buffer layer and waveguide layer between the bias electrodes are removed. The buffer layer of Example 1A is formed of the oxide (composition A) containing La and Al as main components, and the buffer layer of Example 1B is formed of the oxide (composition B) containing Si and In as main components.

Figure 14:
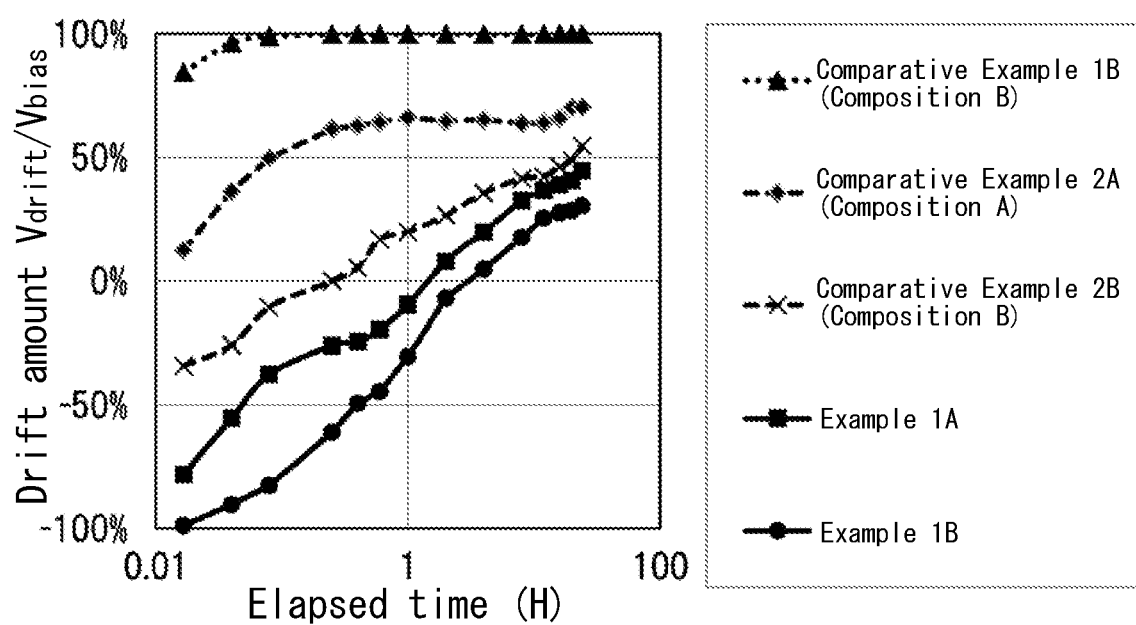
FIG. 14 is a graph illustrating results of the DC drift acceleration test for the optical modulators according to Comparative Examples and Examples.

FIG. 14 is a graph illustrating results of the DC drift acceleration test for the optical modulators according to Comparative Examples 1B, 2A, and 2B and Examples 1A and 1B. The horizontal axis represents an elapsed time (H), and the vertical axis represents a drift amount $V_{drift}/V_{bias}$. The result of the Comparative Example 1A is substantially the same as that of Comparative Example 1B and is thus omitted in the graph.

As illustrated in FIG. 14, in Comparative Examples 1A and 1B, the drift amount becomes 100% immediately after the start of the evaluation test and is saturated immediately. In Comparative Examples 1A and 1B, the time taken for the drift amount to reach 50% is less than one minute, and the drift amount after 24 hours is 100%.

In Comparative Example 2A, the time taken for the drift amount to reach 50% is about five minutes, and the drift amount after 24 hours is about 70%. In Comparative Example 2B, the time taken for the drift amount to reach 50% is about 22 hours, and the drift amount after 24 hours is about 55%. Thus, although the DC drift suppressing effect was obtained by changing the composition of the buffer layer from the composition A to composition B, it was impossible to reduce the drift amount after 24 hours to 50% or less.

On the other hand, in Examples 1A and 1B, the drift amount is not saturated immediately but gradually changes. In Example 1A, the time for the drift amount to reach 50% is 24 hours or more, and the drift amount after 24 hours is about 45%. In Example 1B, the time for the drift amount to reach 50% is also 24 hours or more, and the drift amount after 24 hours is about 30%. Thus, in Examples 1A and 1B in each of which the waveguide layer under the electrode isolation area is removed, the drift amount after 24 hours is reduced to a target value of 50% or less, and the DC drift suppressing effect is high.

REFERENCE SIGNS LIST

1: Substrate
2: Waveguide layer
2r: Ridge part
3: Protective layer
4: Buffer layer
6: Electrode layer
7a: First signal electrode
7a$_1$: One end of first signal electrode
7a$_2$: Other end of first signal electrode
7b: Second signal electrode
7b$_1$: One end of second signal electrode
7b$_2$: Other end of second signal electrode
8a, 8b, 8c: Ground electrode
9a, 9b, 9c, 9d, 9e: Bias electrode
9a$_1$: One end of bias electrode
9b$_1$: One end of bias electrode
10: Mach-Zehnder optical waveguide
10a: First optical waveguide
10b: Second optical waveguide
10c: Demultiplexer
10d: Multiplexer
10e$_1$, 10e$_2$, 10e$_3$: Linear section
10f$_1$, 10f$_2$: Curved section
10i: Input optical waveguide
10o: Output optical waveguide
12: Terminal resistor
13, 13a, 13b: DC voltage source
100, 200, 300, 300-1, 300-2, 300-3, 400: Optical modulator
D: Waveguide layer removal area
$S_0$-$S_5$: Electrode isolation area
$S_{DC}$: DC part
$S_{RF}$: RF part

What is claimed is:

1. An optical modulator comprising:
a substrate;
a waveguide layer including first and second optical waveguides, the waveguide layer being formed of an electro-optic material film on the substrate, the first and second optical waveguides being disposed adjacent to each other;
an RF part that applies a modulating signal to the first and second optical waveguides; and
a DC part that applies a DC bias to the first and second optical waveguides, wherein
the DC part includes:
a buffer layer covering at least upper surfaces of the first and second optical waveguides;
a first bias electrode disposed on the first optical waveguide through the buffer layer; and
a second bias electrode provided adjacent to the first bias electrode,
a first DC bias voltage is applied between the first bias electrode and the second bias electrode,
each of the first and second optical waveguides includes:
a ridge part having a first thickness; and
a slab part adjacent to the ridge part, a thickness of the slab part being less than that of the ridge part,
a first waveguide layer removal area in which at least part of the slab part of the first optical waveguide is removed is provided at least under a first electrode isolation area between the first bias electrode and the second bias electrode, and
the first waveguide layer removal area is only in the DC part.

2. The optical modulator as claimed in claim 1, wherein the DC part further includes a third bias electrode disposed on the second optical waveguide through the buffer layer and a fourth bias electrode provided adjacent to the third bias electrode,
a second DC bias voltage is applied between the third bias electrode and the fourth bias electrode,
a second waveguide layer removal area in which at least part of the slab part of the second optical waveguide is removed is provided under a second electrode isolation area between the third bias electrode and the fourth bias electrode, and
the second waveguide layer removal area is only in the DC part.

3. The optical modulator as claimed in claim 2, wherein the second bias electrode is positioned on a side opposite to the third bias electrode as viewed from the first bias electrode, and the fourth bias electrode is positioned on a side opposite to the first bias electrode as viewed from the third bias electrode.

4. The optical modulator as claimed in claim 3, wherein the DC part further includes a fifth bias electrode provided between the first bias electrode and the third bias electrode,
a third waveguide layer removal area in which at least another part of the slab part of the first optical waveguide is removed is provided under a third electrode isolation area between the first bias electrode and the fifth bias electrode,
a fourth waveguide layer removal area in which at least another part of the slab part of the second optical waveguide is removed is provided under a fourth electrode isolation area between the third bias electrode and the fifth bias electrode, and
the third waveguide layer removal area and the fourth waveguide layer removal area are only in the DC part.

5. The optical modulator as claimed in claim 4, wherein the first to fourth waveguide layer removal areas each are an area in which the slab part is removed together with the buffer layer to expose the substrate.

6. The optical modulator as claimed in claim 5, wherein the first to fourth waveguide layer removal areas each are an area in which a part of the substrate is further removed.

7. The optical modulator as claimed in claim 5, wherein the DC part further includes a protective layer formed between the waveguide layer and the buffer layer so as to cover both side surfaces of each of the first and second optical waveguides, and
the first to fourth waveguide layer removal areas each are an area in which the slab part is removed together with the buffer layer and the protective layer.

8. The optical modulator as claimed in claim 1, wherein the second bias electrode is opposed to the second optical waveguide through the buffer layer.

9. The optical modulator as claimed in claim 1, wherein the first waveguide layer removal area is an area in which the part of the slab part is removed together with the buffer layer and in which the substrate is covered with a remaining part of the slab part.

10. The optical modulator as claimed in claim 1, wherein the RF part includes first and second signal electrodes opposed respectively to the first and second optical waveguides through the buffer layer, a first ground electrode provided adjacent to the first signal electrode, and a second ground electrode provided adjacent to the second signal electrode, and
the waveguide layer under a fifth electrode isolation area between the first signal electrode and the first ground electrode and under a sixth electrode isolation area between the second signal electrode and the second ground electrode is not removed but is left.

11. The optical modulator as claimed in claim 1, wherein each of the first and second optical waveguides has at least one linear section and at least one curved section, the RF part is provided at a position overlapping a part of the linear section in a plain view, and
the DC part is provided at a position overlapping another part of the linear section in a plain view.

12. The optical modulator as claimed in claim 1, wherein the substrate is a single crystal substrate, the electro-optic material film is a lithium niobate film, and the lithium niobate film is an epitaxial film having a film thickness of 2 μm or smaller, and a c-axis of the lithium niobate film is oriented perpendicular to a main surface of the substrate.

13. An optical modulator comprising:
a substrate;
a waveguide layer including first and second optical waveguides, the waveguide layer being of an electro-optic material film formed on the substrate, the first and second optical waveguides being disposed adjacent to each other;
an RF part that applies a modulating signal to the first and second optical waveguides; and
a DC part that applies a DC bias to the first and second optical waveguides, wherein
the DC part includes:
a buffer layer covering at least upper surfaces of the first and second optical waveguides;
a first bias electrode disposed on the first optical waveguide through the buffer layer; and
a second bias electrode provided adjacent to the first bias electrode,
a first DC bias voltage is applied between the first bias electrode and the second bias electrode,
each of the first and second optical waveguides includes a ridge part,
a first minimum thickness of the waveguide layer in a first electrode isolation area between the first bias electrode and the second bias electrode is smaller than a second minimum thickness of the waveguide layer between the first electrode isolation area and the ridge part of the first optical waveguide, and
the waveguide layer has the first minimum thickness only in the DC part.

14. The optical modulator as claimed in claim 13, wherein the DC part further includes a third bias electrode disposed on the second optical waveguide through the buffer layer and a fourth bias electrode provided adjacent to the third bias electrode,
a second DC bias voltage is applied between the third and fourth bias electrodes,
a third minimum thickness of the waveguide layer in a second electrode isolation area between the third bias electrode and the fourth bias electrode is smaller than a fourth minimum thickness of the waveguide layer between the second electrode isolation area and the ridge part of the second optical waveguide, and
the waveguide layer has the third minimum thickness only in the DC part.

15. The optical modulator as claimed in claim 14, wherein the second bias electrode is positioned on a side opposite to the third bias electrode as viewed from the first bias electrode, and
the fourth bias electrode is positioned on a side opposite to the first bias electrode as viewed from the third bias electrode.

16. The optical modulator as claimed in claim 15, wherein the DC part further includes a fifth bias electrode provided between the first bias electrode and the third bias electrode,
a fifth minimum thickness of the waveguide layer in a third electrode isolation area between the first bias electrode and the fifth bias electrode is smaller than a sixth minimum thickness of the waveguide layer between the third electrode isolation area and the ridge part of the first optical waveguide,
a seventh minimum thickness of the waveguide layer in a fourth electrode isolation area between the third bias electrode and the fifth bias electrode is smaller than an eighth minimum thickness of the waveguide layer between the fourth electrode isolation area and the ridge part of the second optical waveguide, and the waveguide layer has the fifth minimum thickness only in the DC part, and the waveguide layer has the seventh minimum thickness only in the DC part.

17. The optical modulator as claimed in claim 13, wherein the second bias electrode is disposed on the second optical waveguide through the buffer layer, and a minimum thickness of the waveguide layer in the first electrode isolation area is smaller than a minimum thickness of the waveguide layer between the first electrode isolation area and the ridge part of the second optical waveguide.

18. The optical modulator as claimed in claim 13, wherein the DC part further includes a protective layer formed between the waveguide layer and the buffer layer so as to cover both side surfaces of each of the first and second optical waveguides, and the waveguide layer in the first electrode isolation area is not covered with the buffer layer and the protective layer but is exposed.

19. The optical modulator as claimed in claim 13, wherein the waveguide layer has a cross-sectional shape gradually reduced in thickness as a distance from the ridge part of the first optical waveguide or the ridge part of the second optical waveguide increases.

* * * * *